US012005958B2

(12) United States Patent
Grinstead

(10) Patent No.: US 12,005,958 B2
(45) Date of Patent: Jun. 11, 2024

(54) UNIVERSAL CHASSIS FRAME WITH VARIABLE REAR AXLE POSITIONS FOR MEDIUM/HEAVY DUTY CONFIGURABLE ELECTRIC TRUCKS

(71) Applicant: Zeus Electric Chassis, Inc., White Bear Lake, MN (US)

(72) Inventor: Robert L. Grinstead, Chisago City, MN (US)

(73) Assignee: Zeus Electric Chassis, Inc., White Bear Lake, MN (US)

( * ) Notice: Subject to any disclaimer, the term of this patent is extended or adjusted under 35 U.S.C. 154(b) by 0 days.

(21) Appl. No.: 17/881,384

(22) Filed: Aug. 4, 2022

(65) Prior Publication Data
US 2023/0202566 A1    Jun. 29, 2023

Related U.S. Application Data

(60) Provisional application No. 63/229,979, filed on Aug. 5, 2021.

(51) Int. Cl.
*B62D 21/14* (2006.01)
*B62D 21/02* (2006.01)

(52) U.S. Cl.
CPC ............. *B62D 21/14* (2013.01); *B62D 21/02* (2013.01)

(58) Field of Classification Search
CPC ...... B62D 21/14; B62D 21/02; B62D 27/065; B62D 21/12; B62D 21/155; Y02T 10/70
See application file for complete search history.

(56) References Cited

U.S. PATENT DOCUMENTS 1,528,915 A * 3/1925 Digmann ............... B62D 21/14
                                                           180/16
2,812,088 A * 11/1957 John ...................... B62D 21/14
                                                           414/478

(Continued)

FOREIGN PATENT DOCUMENTS

CA           2645699 A1 *  6/2009
DE       102012013605 A1 *  1/2014

(Continued)

OTHER PUBLICATIONS

Daigo, Electrically-Driven Cargo Vehicle, Oct. 31, 2019, EPO, JP 2019189140 A, Machine Translation of Description (Year: 2019).*

(Continued)

*Primary Examiner* — James A English
*Assistant Examiner* — Matthew D Lee
(74) *Attorney, Agent, or Firm* — Barnes & Thornburg LLP

(57) ABSTRACT

A universal chassis frame is disclosed having a ladder-frame construction configurable to position a rear axle(s) at variable distances from a back of a vehicle's cab to provide customized rail/bed lengths for different electric truck classes. The chassis frame includes a central frame having a pair of main frame rails to support at least two battery modules substantially within an intra-frame space. A front subframe supports the cab, a front portion including a pair of upper frame members mounted above the corresponding main frame rails, and a front axle unit mounted under the front subframe. A rear subframe supports at least one rear axle unit mounted under the rear subframe and any of multiple configurable rear payload units via a common connection interface affixable to the main frame rails so the rear subframe's location with respect to the main frame is longitudinally variable from the back of the cab.

20 Claims, 28 Drawing Sheets

(56) References Cited

U.S. PATENT DOCUMENTS

| | | | |
|---|---|---|---|
| 3,195,917 A | | 7/1965 | Baldock |
| 4,204,697 A | * | 5/1980 | Santerre ............... B62D 63/065 |
| | | | 280/149.2 |
| 4,697,844 A | * | 10/1987 | Giles .................. B62D 53/0807 |
| | | | 296/25 |
| 5,042,831 A | * | 8/1991 | Kuhns ................... B62D 21/14 |
| | | | 280/786 |
| 6,010,182 A | | 1/2000 | Townsend |
| 6,227,322 B1 | | 5/2001 | Nishikawa |
| 6,692,062 B1 | * | 2/2004 | Woodard ................. B60P 3/32 |
| | | | 296/25 |
| 8,540,272 B1 | * | 9/2013 | Vitale .................. B62D 47/003 |
| | | | 280/638 |
| 8,739,907 B2 | | 6/2014 | Storc et al. |
| 9,422,010 B2 | | 8/2016 | Boettcher et al. |
| 10,112,470 B2 | | 10/2018 | Hamilton et al. |
| 10,131,381 B2 | | 11/2018 | Ashraf et al. |
| 10,493,837 B1 | | 12/2019 | Angelo et al. |
| 10,493,871 B2 | | 12/2019 | Tone |
| 10,899,387 B2 | | 1/2021 | Milton et al. |
| 10,919,575 B1 | | 2/2021 | Sardes et al. |
| 11,117,629 B1 | * | 9/2021 | Wessels ............... B62D 53/068 |
| 2005/0057059 A1 | * | 3/2005 | Green .................. B62D 63/061 |
| | | | 296/26.09 |
| 2005/0110263 A1 | * | 5/2005 | Rini ....................... B62D 21/02 |
| | | | 280/781 |
| 2005/0189788 A1 | * | 9/2005 | Cornell ................ B62D 21/152 |
| | | | 296/187.09 |
| 2006/0181063 A1 | * | 8/2006 | Eddings ................. B62D 21/14 |
| | | | 280/149.2 |
| 2012/0193891 A1 | * | 8/2012 | Wu ......................... B62K 5/007 |
| | | | 292/334 |
| 2013/0038043 A1 | * | 2/2013 | Brown ................... B62D 21/14 |
| | | | 280/656 |
| 2019/0351750 A1 | * | 11/2019 | Caliskan ............... B62D 21/07 |
| 2020/0231212 A1 | | 7/2020 | Kim |
| 2020/0331536 A1 | | 10/2020 | Sloan et al. |
| 2020/0369140 A1 | | 11/2020 | McCarron et al. |
| 2021/0024131 A1 | | 1/2021 | Baccouche et al. |
| 2021/0046978 A1 | | 2/2021 | Forostovsky et al. |
| 2021/0061357 A1 | * | 3/2021 | Braun .................... B62D 21/12 |

FOREIGN PATENT DOCUMENTS

| | | | | |
|---|---|---|---|---|
| GB | 2468031 | A | * | 8/2010 |
| JP | 2019189140 | A | * | 10/2019 |
| JP | 6809661 | B2 | | 1/2021 |
| WO | WO-2011065076 | A1 | * | 6/2011 |
| WO | WO-2012118505 | A1 | * | 9/2012 |
| WO | WO 2020/214031 | | | 10/2020 |
| WO | WO 2021/108429 | | | 6/2021 |

OTHER PUBLICATIONS

"Electric truck manufacturer Zeus Electric Chassis closes on seed round", retrieved at https://www.bizjournals.com/twincities/inno/stories/fundings/2021/04/19/zeus-electriic-truck-manufacturer-whitebear-lake.html on Aug. 5, 2021, dated Apr. 19, 2021, 5 pages.
"Electrify Your Fleet," retrieved at https://zeuselectricchassis.com/ on Aug. 5, 2021, dated May 12, 2021, 12 pages.
"Fleet Electrification with SMUD", retrieved at https://californiamobilitycenter.org/e-spotlight-smud/ on Aug. 5, 2021, dated Jul. 24, 2021, 6 pages.
"SMUD Accelerates Its Fleet Electrification with Five All-Electric Work Trucks from Zeus Electric Chassis, Inc.", dated Feb. 1, 2021, 2 pages.
"Wayne Kugel CEO of Zeus Electric Truck Testified before MN House Committees", dated Feb. 18, 2021, 2 pages.
"Zeus Electric Chassis Becomes Newest Commercial Client at California Mobility Center", dated Mar. 24, 2021, 2 pages.
"Zeus Electric Chassis, Inc. Exceeds Private Seed Round Target", dated Apr. 9, 2021, 2 pages.
"Zeus Electric Utility Truck Chassis Unveiled", retrieved at https://www.truckutilities.com/zeus-electricutility-truck-chassis-unveiled/ on Aug. 5, 2021, dated Mar. 8, 2021, 4 pages.
"Zeus Truck", retrieved at https://startrackstrucks.com/wpcontent/uploads/Zeys-Trucks-5-Page-Flyer-72dpi.pdf on Aug. 5, 2021, dated May 12, 2021, 6 pages.
Guerry, Matthew, "Minnesota Environmental Regulators Tout Electrification Benefits at Visit to Zeus Electric Chassis", retrieved at https://zeuselectricchassis.com/minnesota-environmental-regulators-tout-electrification-benefits-at-visit-to-zeus-electric-chassis/ on Aug. 5, 2021, dated Jun. 18, 2021, 15 pages.
International Search Report and Written Opinion in International Application No. PCT/US2022/039638, dated Nov. 4, 2022, 12 pages.
"Jossi, Frank, ""Minnesota startup sees a growing niche market for electric work trucks"", retrieved at https://energynews.us/2021/02/08/minnesotastartup-sees-a-growing-niche-market-f orelectric-work-tmcks/ on Aug. 5, 2021, dated Feb. 8, 2021, 5 pages".
MacDonald, Mathew, "Zeus Electric Chassis capitalizes on growing electric work truck market", retrieved at https://www.servicetruckmagazine.com/news/zeus-electric-chassis-capitalizes-on-growingelectric-work-t/ on Aug. 5, 2021, dated Feb. 17, 2021, 4 pages.
Nott Company, "EV Systems Leader Nott Company and Zeus Electric Chassis Enter Joint Development Agreement to Lead the Evolution of Vocational Vehicle Electrification", retrieved at https://zeuselectricchassis.com/market-leader-nott-company-to-partner-with-zeus-electric-chassis-inc/ on Aug. 5, 2021, dated Jul. 15, 2021, 14 pages.
Oxendine, Chez, "Choctaw Defense Manufacturing branches out with Zeus Electric Chassis partnership", Tribal Business News, retrieved at https://tribalbusinessnews.com/sections/economic-development/ 13532-choctaw-defense-manufacturing-branches-out-with-zeus-electricchassis-partnership on Aug. 5, 2021, dated Jun. 21, 2021, 14 pages.
"Wood, Drew, ""Zeus Electric Chassis and the All-Electric Work Truck"", Minneapolis St. Paul Magazine, retrieved at https://mspmag.com/arts-and-culture/zeus-electric-chassis/ on Aug. 5, 2021, dated Apr. 29, 2021, 4 pages".
Zeus Electric Chassis Facebook Page, retrieved at https://www.facebook.com/zeuselectricchassis/ on Aug. 5, 2021, dated Aug. 4, 2021, 17 pages.
Zeus Electric Chassis, "Experience the Uncompromising Zeus All-Electric Work Truck Chassis at FDIC This August", retrieved at https://zeuselectricchassis.com/see-the-zeus-all-electric-work-truck-chassis-at-fdic-this-august/ on Aug. 5, 2021, dated Jul. 14, 2021, 14 pages.
Zeus Electric Chassis, "Zeus Announces SMUD as First Customer for Configurable, All Electric Work Trucks", retrieved at https://zeuselectricchassis.com/zeus-announces-smud-as-first-customer-for-configurable-all-electric-work-trucks/ on Aug. 5, 2021, dated May 12, 2021, 14 pages.
Zeus Electric Chassis, "Zeus Electric Truck Chassis", retrieved at https://web.archive.org/web/20200814081155/ https://startrackstrucks.com/zeus-electric-chassis/ on Aug. 5, 2021, dated Aug. 14, 2020, 12 pages.
Zeus Electric Chassis, "Zeus Electric Work Truck Reveal, Jan. 2021", YouTube, Jun. 24, 2021 [retrieved Jan. 22, 2024], retrieved from Internet: <URL: https://www.youtube.com/watch?v=itufNm1Rnkw>, entire video, cited in International Search Report and Written Opinion in International Application No. PCT/US2022/039638, dated Nov. 4, 2022, 3 pages.
Zeus Electric Chassis, Inc., "Photo Gallery from Fleet Day, Jul. 2021", retrieved at https://zeuselectricchassis.com/photo-gallery-from-fleet-day-july-2021/ on Aug. 5, 2021, dated Jul. 22, 2021, 14 pages.
Zeus Electric Chassis, Inc., "Zeus Electric Chassis, Inc. to Provide Chassis for Pegasus Bus Company", retrieved at https://zeuselectricchassis.com/zeus-electric-chassis-inc-to-provide-chassis-for-pegasus-electric-buses/ on Aug. 5, 2021, dated Jul. 21, 2021, 15 pages.

(56) References Cited

OTHER PUBLICATIONS

Zeus Electric Chassis, video, retrieved at https ://link.edgepilot.com/ s/68bf42ff/-89KaCe5fUCsy6f7i94J2A?u== https:// vimeo.com/ 494235950 on Aug. 5, 2021, dated Dec. 23, 2020, 18 pages.

* cited by examiner

| VEHICLE FAMILY | GVWR | TRUCK CLASS(S) | CABIN TYPE | FWD | AWD | PROPULSION (V) | KW PROPULSION [C] | KWH (BATTERY) |
|---|---|---|---|---|---|---|---|---|
| LIGHT DUTY | 10,001-17,000 | 3,4,5 | ALL | X |  | 800 | 170 | 140-210 |
| MEDIUM DUTY | 17,000-22,300 | 3,4,5,6 | ALL |  | X | 400 | 206 | 105-175 |
| HEAVY DUTY | 23,000-50,000 | 6,7,8 | ALL |  | X | 800 | 382 | UP TO 420 |

UNIVERSAL CHASSIS FRAME WITH VARIABLE REAR AXLE POSITIONS FOR MEDIUM/HEAVY DUTY CONFIGURABLE ELECTRIC TRUCKS

RELATED APPLICATION

This application claims the benefit of U.S. Provisional Application No. 63/229,979 filed Aug. 5, 2021, which is hereby fully incorporated herein by reference.

TECHNICAL FIELD

The present disclosure relates to understructures on which a vehicle body may be mounted comprising longitudinal and transverse frame members constructed of a ladder-style frame with front axle and rear axle units. More particularly, the present disclosure relates to a universal chassis frame for configurable electric trucks having a variable set of preset distances to position one or more rear axles from a back of cab that can support gross vehicle weights across a range of medium-duty and heavy-duty classes of commercial trucks.

BACKGROUND

Electric vehicles powered by battery systems, rather than combustion engines, are gaining popularity due to improved battery life and performance. Most of the advances in electric vehicles, however, have been with respect to electric passenger vehicles. For electric trucks, improvements have focused primarily on converting traditional combustion engine trucks into electric versions. While there has been a range of advancements with respect to the electric motors and batteries, improvements to the chassis for electric trucks remain largely unexplored.

One of the primary challenges to substantial chassis improvements for trucks were the constraints posed by the drivetrains for combustible engines. These drivetrains included a driveshaft made of a length of a solid metal rod that translated power from the engine in the front of the truck to the rear axle. Another challenge came from the differential connected between the drive shaft and the axle to allow one wheel to spin faster than the other wheel, even though the driveshaft is rotating at a constant speed to reduce wheel slippage when rounding a curve. Although the use of electric motors instead of combustion engines can reduce or eliminate these constraints, there has been relatively little focus on changes to the conventional types of chassis used for medium-duty and heavy-duty classes of trucks with gross vehicle weight ratings (GVWR) in the range above 10,000 lbs (4,500 kg).

Skateboard/platform frame constructions for a body-on-frame type of vehicle have been proposed for electric passenger vehicles as described, for example, in U.S. Pat. Nos. 6,227,322, 8,739,907, 10,112,470, 10,131,381, and 10,919,575 and U.S. Publ. Appl. Nos. 2019/0351750 A1, 2020/0369140 A1, and 2021/0024131 A1. These types of frames are not modular or adjustable in terms of the longitudinal construction of the frame.

Existing designs for modular or variable chassis constructions for combustion-powered vehicles have been proposed. U.S. Pat. No. 5,042,831 describes an adjustable length vehicle chassis having front and rear reach beams and a center beam, in which the center beam is telescopically slidable into the reach beams and one reach beam is telescopically slidable into the other reach beam to attain minimum length adjustments of the chassis. U.S. Pat. No. 6,010,182 describes a vehicle chassis and body construction with a node and interlocking spaceframe system that allows the vehicle chassis to be assembled by hand in the field. U.S. Pat. No. 9,422,010 describes a vehicle frame assembly that has a variable length longitudinal frame component to accommodate different cab lengths; however, the relative placement of the axle to the cab remains constant despite the differing configurations.

Improvements in the design and configuration of truck chassis frames, especially for modularity in the ladder-frame chassis for the medium/heavy-duty classes of commercial electric trucks would be desirable.

SUMMARY

A universal chassis frame is disclosed that having a ladder-frame construction that is configurable to position the rear axle(s) at variable set of preset distances from the back of the cab of the vehicle to provide for customized rail/bed lengths over a range of medium/heavy classes of electric trucks. In various embodiments, the chassis frame includes a central frame having a pair of main frame rails configured to support at least two battery modules substantially within an intra-frame space defined between the pair of main frame rails and between at least a pair of cross members transversely interconnected to the pair of main frame rails. A front subframe is configured to support a cab, the front portion including a pair of upper frame members mounted above the corresponding pair of the main frame rails, and a front axle unit mounted under the front subframe. A rear subframe is configured to support at least one rear axle unit mounted under the rear subframe and any of a set of multiple configurable rear payload units via a common connection interface. The rear subframe is affixable to the main frame rails such that the location of the rear subframe with respect to the main frame is longitudinally variable at different sets of predetermined distances from the back of the cab.

In some embodiments, each axle unit has a single electric motor powered by a battery management system. In various embodiments, each motor is mounted forward of the corresponding axle unit. In other embodiments, only a rear axle unit has an electric motor and a front axle unit does not. In various embodiments, the battery management system manages the distribution of electrical power from the at least two battery modules to the electric motors for propulsion as well as to any auxiliary power used, for example, by a rear payload module.

A ladder frame for an electric truck in accordance with various embodiments that enables a modular longitudinal configuration allows a center of gravity of the electric truck to be customized for the wide range of existing applications for class 3-8 medium/heavy duty trucks without the need for multiple chassis styles and sizes. Providing a modular longitudinal configuration for a universal chassis in accordance with various embodiments can improve vehicle lifespan by simplifying servicing, reconfiguration and repairs that occur more often for medium/heavy duty trucks than passenger vehicles due to the nature of heavy use on these classes of trucks.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
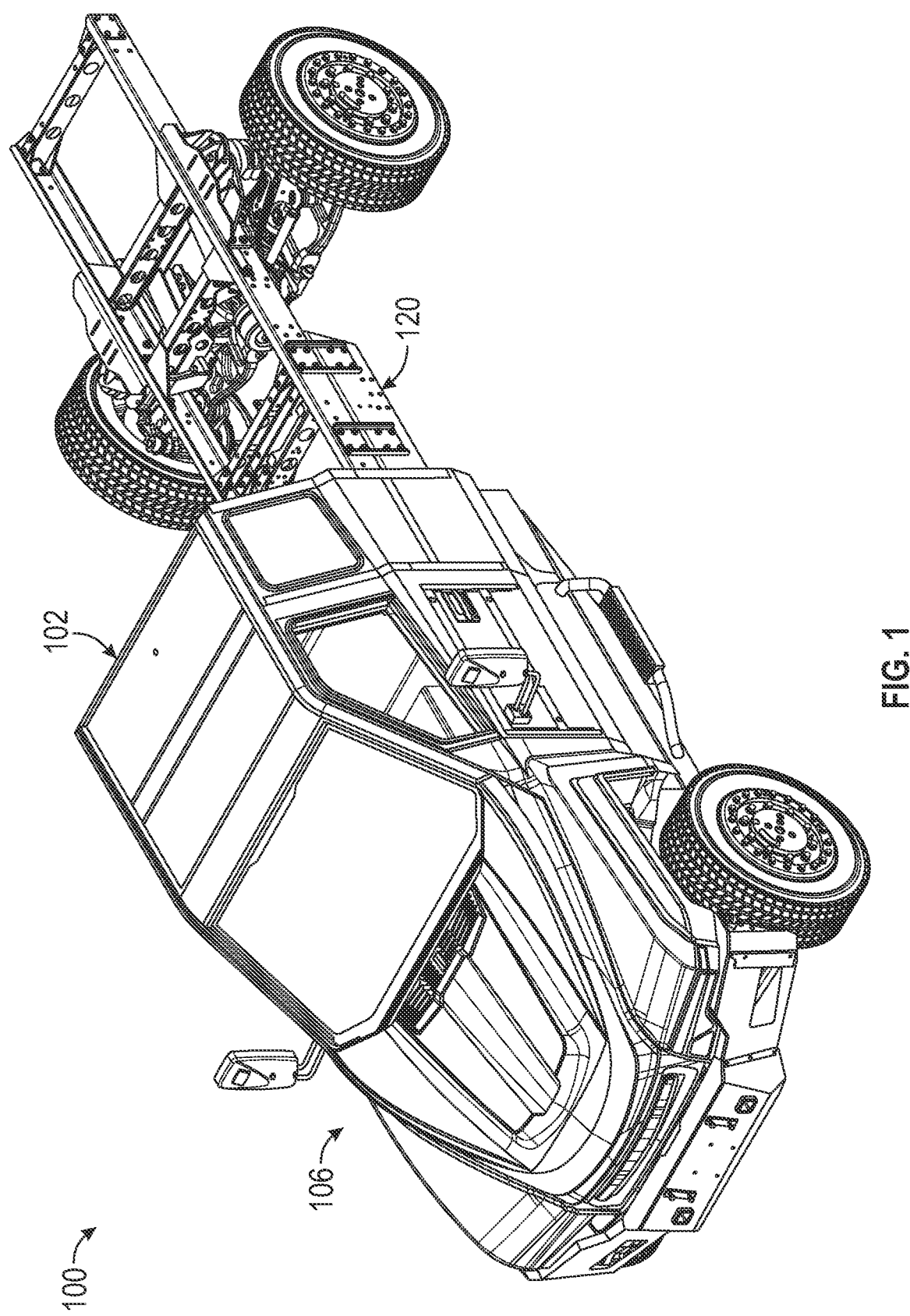
FIG. 1 is a perspective view of a cab chassis vehicle, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments disclosed herein are directed to aspects of chassis and frame components, configurations, and constructions thereof, and to electric truck vehicles having such chassis and frame components.

As used herein, terms of direction or spatial orientation shall be generally understood according to their ordinary and customary meanings. By way of partial examples, "longitudinal" refers to a lengthwise direction or primary direction of travel of the vehicle, e.g., in the forward or rearward directions as commonly understood; "lateral" or cross refers to a direction generally transverse to longitudinal; "fore" or forward refers to the front of the vehicle with respect to the primary direction of travel; "aft" or rearward refers to the rear of the vehicle with respect to the primary direction of travel; "left" is in relation to facing forward; "right" is in relation to facing forward; "down" or below refers to the direction of the ground or surface on which the vehicle is intended to be operated; and "up" or above refers to a direction generally opposite of down.

Referring now to FIG. 1, a vehicle 100 is depicted, including a cab 102 coupled to a chassis 120. In an embodiment, vehicle 100 may be configured as a "cab chassis" or "chassis cab" vehicle as depicted, for supply to an upfitting specialist for final configuring as one of many types of vehicles or truck with configurable rear portions such as: service truck, flatbed, box truck, dump truck, garbage truck, street cleaner, roll off truck, bus, mini-bus, recreational vehicle, and the like. In another embodiment, vehicle 100 may be configured fully assembled with a configurable rear portion 110, which is further depicted and described in FIG. 10, already provided and attached for delivery to an end customer.

As shown in FIGS. 8-11, medium-duty electric trucks in accordance with various embodiments of a common electric truck chassis-frame approach that provides a common design platform for such vehicles is configurable to meet the mission needs of vocations such as municipalities, utilities, construction, refuse and emergency vehicles. In some embodiments, upfitting kits may be provided for various embodiments of a rear payload module carried by the rear portion 110 of the chassis 120, such as telescopic aerial buckets, cherry pickers, specialty food service, heavy-duty service units, ambulance, rescue, and snow removal. In other embodiments, the electric trucks may include integration of a myriad of aftermarket tools such as welders, hydraulics, air compressors, generators, or the like, in either or both the rear portion 110 or the cab portion 102 of the vehicle 100.

In various embodiments, cab 102 may include a passenger compartment 104 that may be configured in a variety of manners as desired. As depicted in FIG. 1, passenger compartment 104 may be configured as a two-door extended cab. Optionally, one or more rearward-opening doors may be included for ease of access to space behind the driver and front passenger seats. Passenger compartment 104 may include one or more storage spaces or cubbies therein. In other embodiments, passenger compartment 104 may be configured as a four-door crew cab.

In embodiments, cab 102 may include a frontal compartment 106, defined by a hood, fenders, front grill and firewall. Frontal compartment 106 may include a battery management system, a thermal management system for one or more of electric motors or batteries, and/or HVAC components for cab 102 as shown, for example, at 107a, 107b in FIG. 15.

Referring generally to the Figures, chassis 120 may generally include a frame 122 and two or more axle assemblies 170a, 170b. As described in further detail below, frame 122 generally includes one or more frames or frame sections having combinations of longitudinal rails and cross-members, while each axle assembly 170a, 170b may generally include one or more of suspension, wheel, brake or drivetrain components, or combinations thereof. As used herein, "chassis" may be understood to refer only to structural components (e.g., frame 122) of the vehicle, or to refer to structural components in combination with one or more of suspension components or drivetrain components (e.g., axle assemblies 170a, 170b), or to refer to structural components in combination with one or more of suspension components or drivetrain components in further combination with one or more of electric motors and batteries (e.g., a rolling chassis, or a vehicle lacking bodywork).

Referring now to FIGS. 2-7, frame 122 may comprise a central frame portion 130, a rear subframe 140 coupled to the central frame portion 130, and a front subframe 150 coupled to the central frame portion 130. In other embodiments not pictured, either one of rear subframe 140 or front subframe 150 may be omitted with frame portion 130 configured to extend substantially to the rear or the front of the vehicle, respectively, as necessary.

Central frame portion 130 may include a first or left central frame rail 132, and a second or right central frame rail 133 joined thereto by one or more cross-members 134. As depicted generally in the Figures, frame rails 132, 133 may comprise an inwardly facing C-shaped profile, although other profile configurations of the frame rails such as boxed, tubular, or others are contemplated. Frame rails 132, 133 are generally parallel to one another. Frame rails 132, 133 generally define, or are horizontally aligned along, a first plane P1. In an embodiment, each of frame rails 132, 133 may have a height within a range of approximately four to twelve inches, and in another embodiment a height of approximately ten inches, although other sizes are contemplated. In various embodiments, a profile (or height) of frame rails 132, 133 may be generally consistent along a longitudinal length, although various tapered, notched or step sections may be included at different longitudinal locations along the frame rails as desired.

Cross-members 134, as depicted generally in the Figures, may comprise a boxed I-beam configuration, although in other embodiments C-shaped, tubular or other configurations of the cross-members are contemplated. In various embodiments, the number, placement and orientation of cross-members 134 depicted in the Figures may be considered merely exemplary and not limiting.

Central frame portion 130 may include or otherwise be coupled with various brackets or attachments, such as for example body mounting brackets for attachment of cab 102 thereto. In an embodiment, a battery module 194 may be sized and configured such that battery module 194 generally fits within a side profile (or height) of the frame rails of central frame portion 130 such that battery module 194 when installed does not extend laterally beyond the frame rails 132, 133 and does not protrude significantly above or below the height of frame rails 132, 133.

Referring now to rear subframe 140, a first or left rear frame rail 142 and a second or right rear frame rail 143 may be included. One or more rear cross-members 144 configured to connect frame rails 142, 143 may also be included as part of rear subframe 140. As depicted generally in the Figures, frame rails 142, 143 may comprise a C-shaped profile, although other configurations such as boxed, tubular, or others are contemplated. Frame rails 142, 143 are depicted as being generally parallel to one another, however other configurations are contemplated such as tapered width wherein the distance between frame rails is not constant. Frame rails 142, 143 generally define, or are horizontally aligned along, a second plane P2. In an embodiment, each of frame rails 142, 143 may have a height within a range of approximately four to twelve inches, and in another embodiment a height of approximately six inches, although other sizes are contemplated. The profile of frame rails 142, 143 may be generally consistent along a longitudinal length, although various tapered, notched or step sections may be included at different longitudinal locations along the frame rails as desired.

Rear cross-members 144, as depicted generally in the Figures, may comprise a boxed configuration, although in other embodiments C-shaped, tubular or other configurations are contemplated. In embodiments, the exact number, placement and orientation of cross-members 144 depicted in the Figures may be considered merely exemplary and not limiting.

Rear subframe 140 may include or otherwise be coupled with various brackets or attachments, such as for example brackets or other means for attachment of a rear payload module or accessory to the rear portion 110 of vehicle 100 such as but limited to a flatbed, utility boxes, enclosed box, dump box, and the like.

In various embodiments, frame rails 142, 143 are provided with a uniform set of bolt hole patterns to be used for attachment of rear payload module. In embodiments, a uniform set of bracket assemblies include a lower set of bolt holes that interface with the bolt hole patterns on the frame rails, and an upper portion of individual brackets includes attachment mating structure appropriate for securing one or more different types of rear payload modules. In embodiments, the bolt hole patterns and bracket assemblies are configured to provide structural support and integrity to attach and carry rear payloads for rail frames having a standardized frame width, e.g., 34 inches.

Figure 19A:
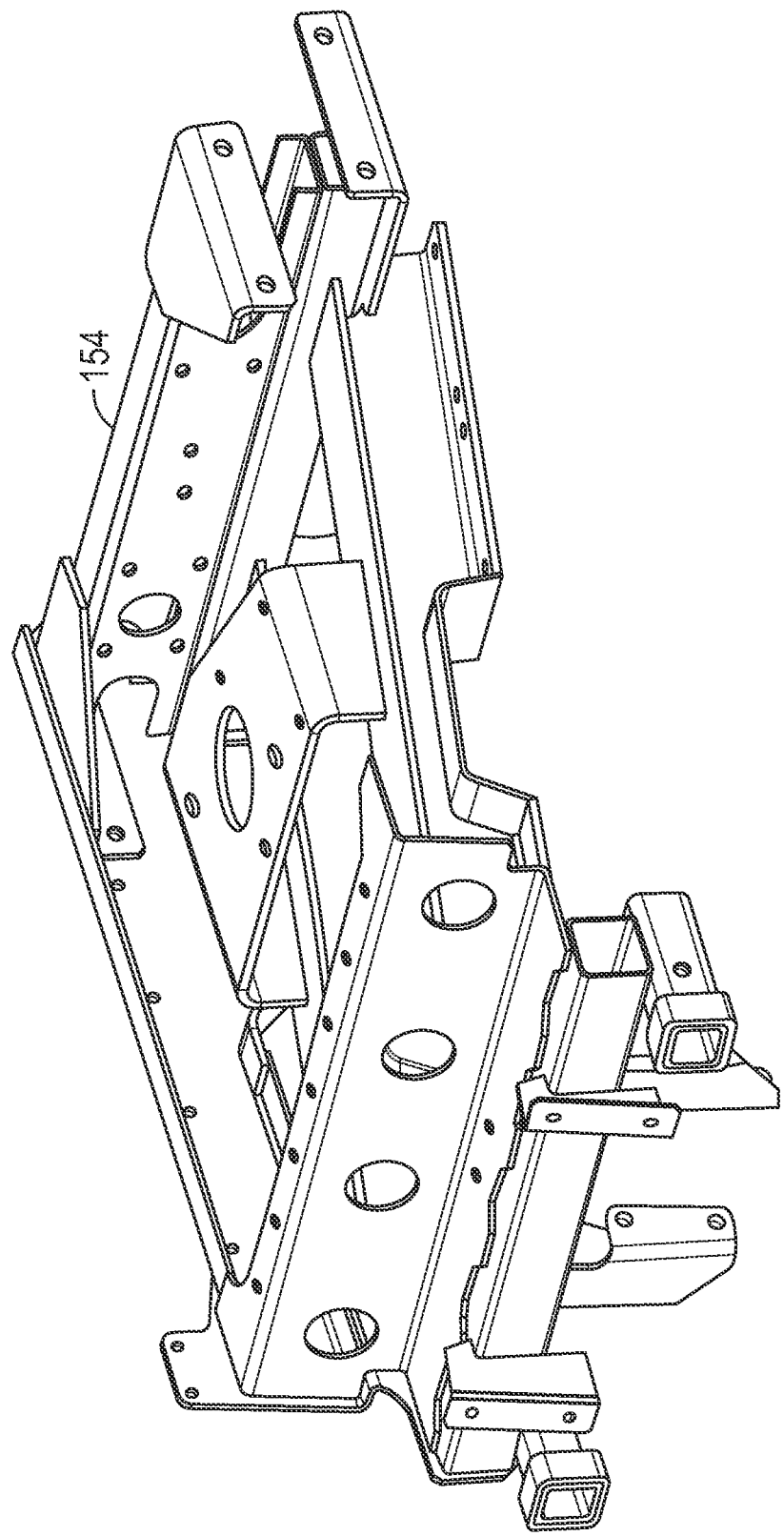
FIGS. 19A and 19B are each a perspective view of a frame axle cradle for a front axle unit and a rear axle unit, respectively, according to further embodiments.
Figure 19B:
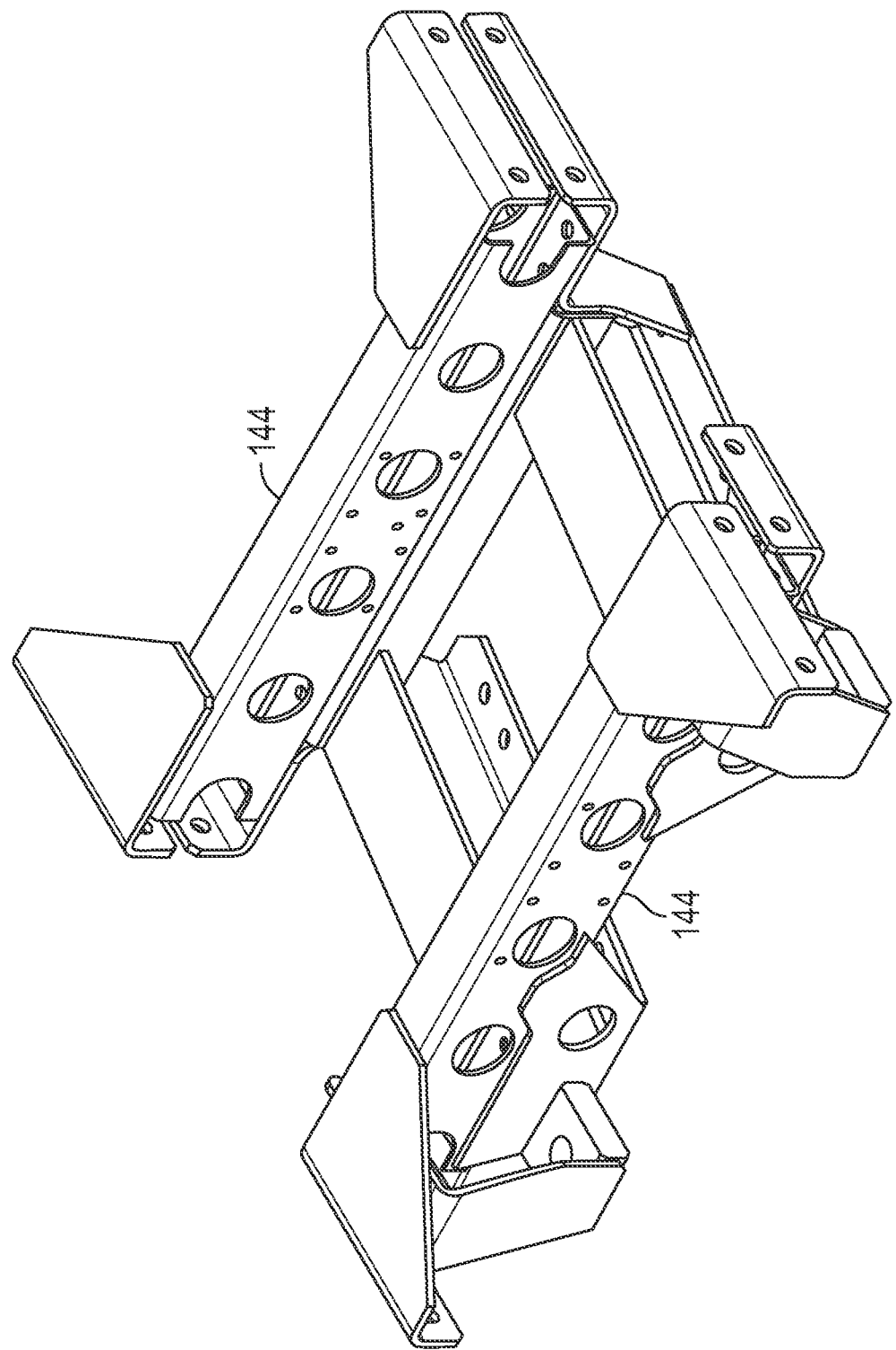

Rear subframe 140 may also include one or more brackets, mounting points or other means for attachment of at least one axle assembly 170 thereto. In various embodiments as shown in FIG. 19, rear subframe 140 includes an axle mount structure formed of a pair of secondary frame rails each having a C-shaped cross-section oriented inwardly and a pair of cross-members each having an I-shaped cross-section. As shown in this embodiment, rear subframe 140 includes a rear-weldment assembly that includes a cradle for rear axle that can slide back and forth to be positioned longitudinally at different locations along rear subframe 140 to accommodate different longitudinal positions of the rear axle.

In various embodiments, rear subframe 140 is configured to be coupled to central frame portion 130, such as by use of brackets 141a, 141b, 141c for connection therebetween as generally depicted in the Figures, or alternately by direct coupling therebetween, or a combination thereof. Rear subframe 140 may overlap with central frame portion 130 as desired for strength, rigidity, load-carrying capabilities, other advantages, or combinations thereof. As depicted in the Figures, rear subframe 140 may overlap with central frame portion 130 such that rear subframe 140 extends generally close to the rear of cab 102. In other configurations rear subframe 140 may overlap with central frame portion 130 to a lesser or greater amount than is depicted in the Figures, such as by less than a foot to a few feet or more.

In various embodiments, rear subframe 140 may also include or otherwise define one or more intra-frame spaces or compartments 148a-c for the receipt and mounting of batteries or battery packs 194a-c therein. In an embodiment, an individual battery module 194 mounted within a given compartment 148 may be sized and configured such that battery 194 fits within a side profile (or height) of the frame rails of rear subframe 140 such that battery 194 when installed does not protrude above or below the height of frame rails 142, 143.

Referring now to front subframe 150, a first or left front frame rail 152 and a second or right front frame rail 153 may be included. One or more front cross-members 154 configured to connect frame rails 153, 154 may also be included as part of front subframe 150. As depicted generally in the Figures, frame rails 152, 153 may comprise a C-shaped profile, although other configurations such as boxed, tubular, or others are contemplated. Frame rails 152, 153 are depicted as being generally parallel to one another, however other configurations are contemplated such as tapered width wherein the distance between frame rails is not constant. Frame rails 152, 153 generally define, or are horizontally aligned along, second plane P2.

In an embodiment, each of front frame rails 152, 153 may have a height within a range of approximately four to twelve inches, although other sizes are contemplated. The profile of frame rails 152, 153 may be generally consistent along a longitudinal length, although various tapered, notched or step sections may be included at different longitudinal locations along the frame rails as desired. As depicted, each of front frame rails 152, 153 include a stepped profile with a relatively taller rearward section and a relatively shorter frontal section.

Front cross-members 154, as depicted generally in the Figures, may comprise a boxed configuration, although in other embodiments C-shaped, tubular or other configurations are contemplated. In embodiments, the exact number, placement and orientation of cross-members 154 depicted in the Figures may be considered merely exemplary and not limiting.

Front subframe 150 may include or otherwise be coupled with various brackets or attachments, such as for example brackets or other means for attachment for crash structures, bodywork, underhood components, front-mounted components such as a winch or snowplow, or other accessories. Front subframe 150 may also include one or more brackets, mounting points or other means for attachment of axle assembly 170 thereto. Front subframe 150 is configured to be coupled to central frame portion 130, such as by use of brackets for connection therebetween as generally depicted in the Figures, or alternately by direct coupling therebetween, or a combination thereof. Front subframe 150 may overlap with central frame portion 130 as desired for strength, rigidity, load-carrying capabilities, other advantages, or combinations thereof. Front subframe 150 may overlap with central frame portion 130 in a range between generally less than a foot, up to a few feet.

The modular arrangement of frame 122 including central frame portion 130, rear subframe 140 and front subframe 150 provides advantages for reconfigurability and repair of vehicle 100. For example, rear subframe 140 could simply be unbolted and replaced with a different rear subframe of different dimension and/or construction to configure vehicle 100 for a different use or purpose such as: service truck, flatbed, box truck, dump truck, garbage truck, street cleaner, roll off truck, bus, mini-bus, recreational vehicle, and the like. Additionally, if one portion of frame 122 becomes damaged or otherwise unusable, that component (130, 140, 150) may be easily replaced without having to replace the entire frame 122.

In various embodiments, the range of payloads and GVWR for a commercial electric truck utilizing the common chassis frame as disclosed generally can be up to a maximum of the combination of the axle ratings minus the weights of the chassis frame, battery units, cab and auxiliary features. In one embodiment in which the front axle rating is 7,300 pounds and rear axle rating is 16,000 pounds for a total gross vehicle weight rating of 22,300 lbs.

In various embodiments the weight of the chassis frame and the battery units are each in the range of 1,500-3,000 lbs, depending upon configuration (e.g. front-wheel drive vs. all-wheel drive) and the total number of battery packs (e.g., 2-4+), which combined with a range of 500-4,000 lbs for the weight of the cab, passengers, and auxiliary units generate a payload range for these embodiments up to 16,000 lbs. In various embodiments, the total payload capacity can be allocated between rear module payload weight and cargo payload weights according to the specific type of rear payload module for which the vehicle is configured.

In various embodiments, the frame rails can be formed of 80 k tensile high-strength/low-alloy (HSLA) steel and the other metal materials and members are formed of 50 k HSLA steel. In some embodiments, the steel members are formed of ASTM 6560 Grade 80 material. In some embodiments, the aluminum members are formed of Aluminum 5052 and/or Aluminum 6061 T6. In various embodiments, a resistance bending moment (RBM) for the frame rails and/or frame chassis can range from 1-4 million, depending upon configuration, material and construction of the chassis frame.

Referring now to axle assemblies 170, the term "axle" as used therein refers to components associated with wheel pairs of the vehicle (e.g., a front axle assembly 170a or a rear axle assembly 170b), and not refer only to an axle or shaft component. Each axle assembly 170 may include suspension components, such as springs, dampers, and a-arms as depicted in the Figures, to comprise an independent suspension. In other embodiments, suspension components may be of any variety of suspension arrangements as known in the art, including independent or dependent. Each axle assembly 170a, 170b may also include braking components, such as outboard mounted disc brakes as depicted in the Figures, or other outboard or inboard braking arrangements as known in the art. Each axle assembly 170a, 170b may also include a differential and half-shafts, or other drive arrangements. At least front axle assembly 170a may include or otherwise couple with a steering rack and other steering components. In an embodiment, rear axle assembly 170b may also include or otherwise couple with a steering rack and other steering components so as to allow the rear wheels of vehicle 100 to be steerable.

In an embodiment, front axle assembly 170a and rear axle assembly 170b may be substantially similar or even identical, with or without the exception of any steering-related components. In such an arrangement, repair or replacement of individual components (or the entire axle assembly) is simplified by requiring fewer unique parts for the vehicle.

Each axle assembly 170 may be coupled with or removed from frame 122 as a complete assembly.

Although not depicted, it will be understood vehicle 100 may be provided with additional axle assemblies, for example an additional rear axle arrangement so as to create a tandem axle configuration. Optionally, rear subframe 140 may be lengthened or otherwise modified to accommodate additional axles assemblies as needed. Any additional axle assemblies may be driven axles, or may be non-driven.

Referring now to propulsion of vehicle 100, one or more electric motors 190 may be included. In an embodiment, a single electric motor 190 may be included with one of axle assemblies 170. In another embodiment, an electric motor 190 may be included with each of axle assemblies 170a, 170b, for a total of two electric motors 190a, 190b. As generally depicted in the Figures, electric motors 190a, 190b are mounted generally along a longitudinal centerline of frame 122, being coupled between axle assemblies 170a, 170b and portions of frame 122. Also as depicted in the Figures, electric motors 190a, 190b are positioned forward of axle assemblies 170a, 170b. In some embodiments, vehicle 100 is configured with electric motors to drive each axle assembly. Vehicle 100 may also be configured to selectively operate only one electric motor depending on driving conditions, for example during steady-state operation. In some embodiments, vehicle 100 may have a single (front) electric motor 190a configured as a front-wheel drive electric truck suitable for a GVWR above to 10,000 lbs (4,500 kg). Providing power to electric motor(s) 190 may be two or more batteries or battery packs 194.

In various embodiments as depicted in the Figures, vehicle 100 includes three battery packs 194, although greater or fewer batteries are also contemplated. Suitable battery types include lithium-ion, lithium iron phosphate (LiFePOx), or other types such as hydrogen (fuel cell), LiCo, LiNiCoAl, and LiTi. In embodiments, suitable total battery capacity for vehicle 100 may be 105 kWh or more, 150 kWh or more, 200 kWh or more, 250 kWh or more, 400 kWh or more.

Generally the size, configuration and placement of battery packs 194 should be selected for convenient placement and packaging with respect to frame 122. Additionally, one or more battery packs 194 may be sized and configured to fit within the boundaries of one or more generally longitudinal frame rails, such that the one or more battery packs are inboard of the frame rails and located in an intra-frame space. In another embodiment, one or more battery packs 194 may be sized and configured to fit within a battery compartment defined by one or more frame rails and cross-members.

In an embodiment, one or more battery packs 194 may be sized and configured to fit within a side profile (or height) of individual frame rails, such that when viewed from the side the battery pack does not extend or protrude above or below a profile defined by a frame rail. In another embodiment, one or more battery packs 194 may be sized and configured to fit within one of an upper or lower bound of a profile of a frame rail (e.g., the battery back may extend above, but not below a side profile of a frame rail, or alternatively the battery back may extend below, but not above a side profile of a frame rail). In various embodiments, the height of a given battery pack 194 does not extend to more than 130% of a height of a corresponding frame rail. In some embodiments, the height of a given battery pack 194 does not extend to more than 120% of a height of a corresponding frame rail. In some embodiments, any height of a given battery pack 194 that extends above or below the side profile of a corresponding frame member extends further above than below to not impact the ground clearance of the vehicle.

In other embodiments, one or more battery packs 194 may be sized and configured to be mounted to vehicle 102 in other arrangements such as mounted below or above one or more frame rails or mounted in a behind-the-seat arrangement with respect to cab 102. In another embodiment, one or more battery packs 194 may be sized and configured without regard to proportions of the frame rails of vehicle 102. In some embodiments, a protection plate may be included before one or more of the battery packs 194 to improve protection against damage to the battery pack by road debris or ground terrain, such as boulders, rocks or curbs.

The size, configuration and placement of components of vehicle 102, particularly of battery packs 194, provides advantages for vehicle dynamics and weight/load distribution. For example, in some embodiments, a center of gravity (CG) of an unladen vehicle 102 without accounting for any operator or payload weight is engineered to be proximate a center of vehicle in plan view, e.g. (~0-4" of a center line of the wheel base and ~2"-10" above a plane of a top of the pair of frame rails).

Embodiments described herein may be suitable for vehicles of gross vehicle weight ratings (GVWR) above 10,000 pounds, generally known as Class 3-Class 8 vehicles in the United States. In various embodiments, the range of dimensions from the back of the cab to the rear axle can be between 60"-200". In various embodiments, the range of dimensions from the rear axle to the back of the rear frame can be between 30"-80". In various embodiments, these dimensional ranges are sufficient to accommodate a wide variety of rear modules for Class 3-8 trucks on the common frame chassis embodiments as disclosed.

Figure 8:
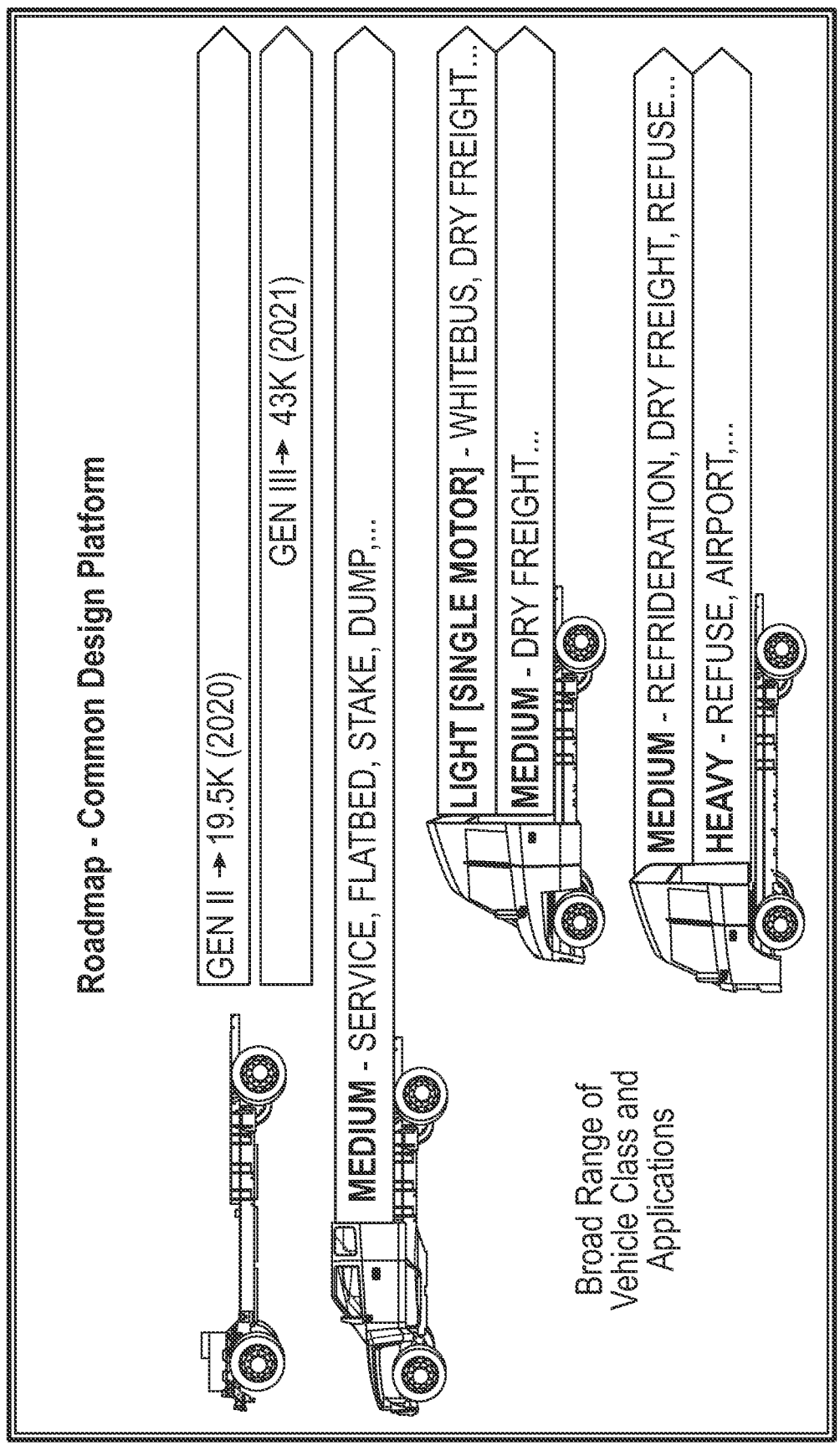
FIG. 8 is a schematic of the common design platform of a reconfigurable cab chassis electric truck in different configurations.
Figure 9:
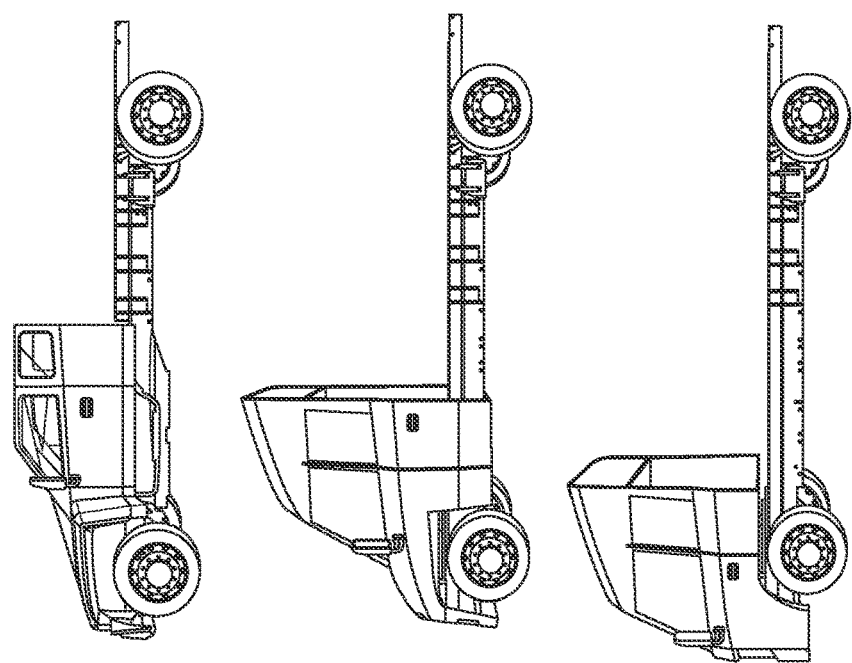
FIG. 9 is a schematic of different embodiments of an electric truck with different implementations of the common design platform of a reconfigurable cab chassis of FIG. 10.

As shown in FIG. 8, a common bed design for medium duty electric trucks 102 in accordance with various embodiments of the present disclosure allows a common frame design to accommodate a broader range of GVWR while providing a common interface structure for various different types of configurable rear portions 110. FIG. 9 presents a table of GVWR ratings with respect to different cab types of various embodiments of the present disclosure.

Figure 10:
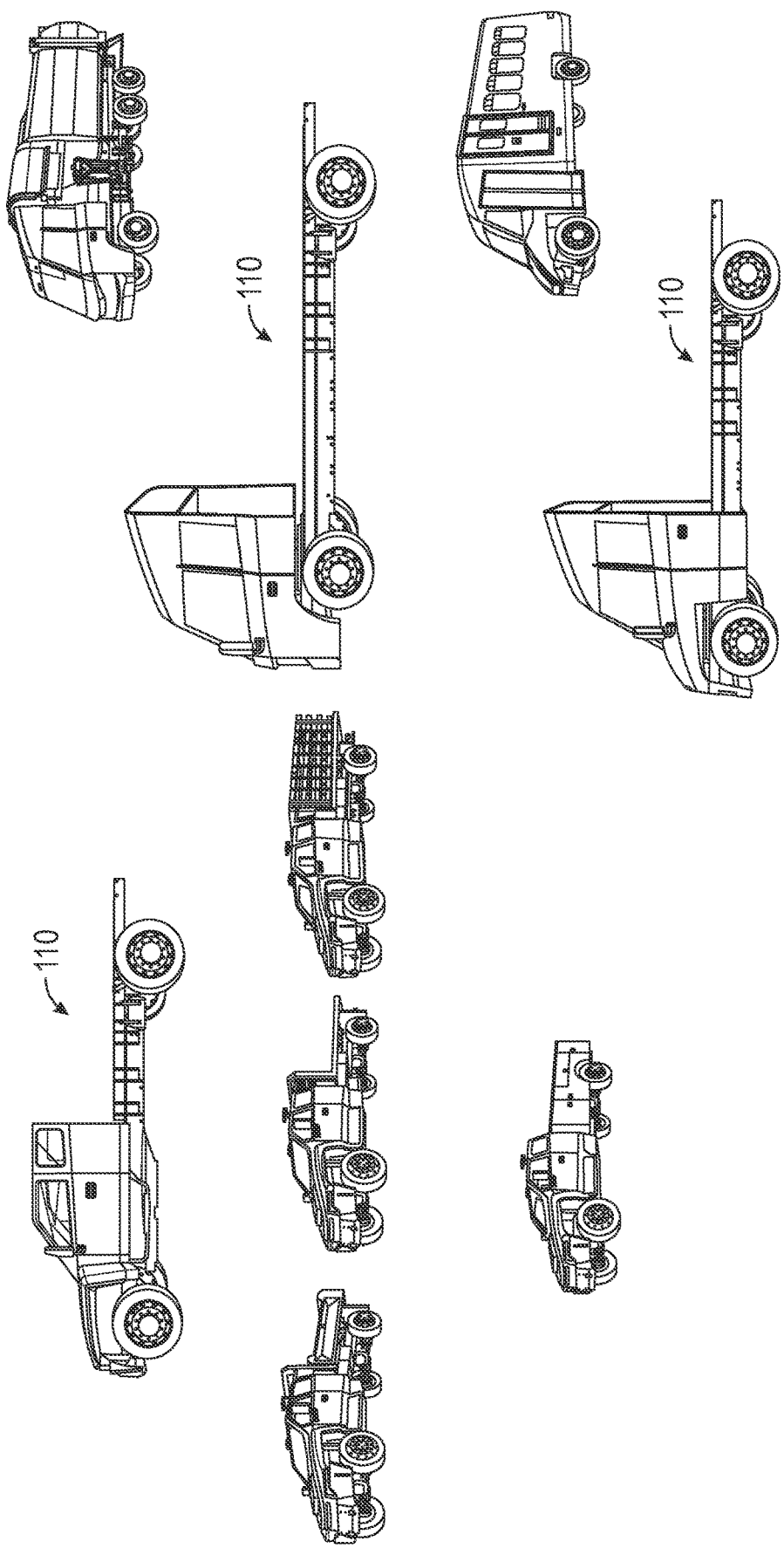
FIG. 10 is a schematic of different embodiments of a rear portion on an embodiment of a chassis for the different implementations of a reconfigurable cab chassis electric trucks shown in FIG. 9.
Figure 11:
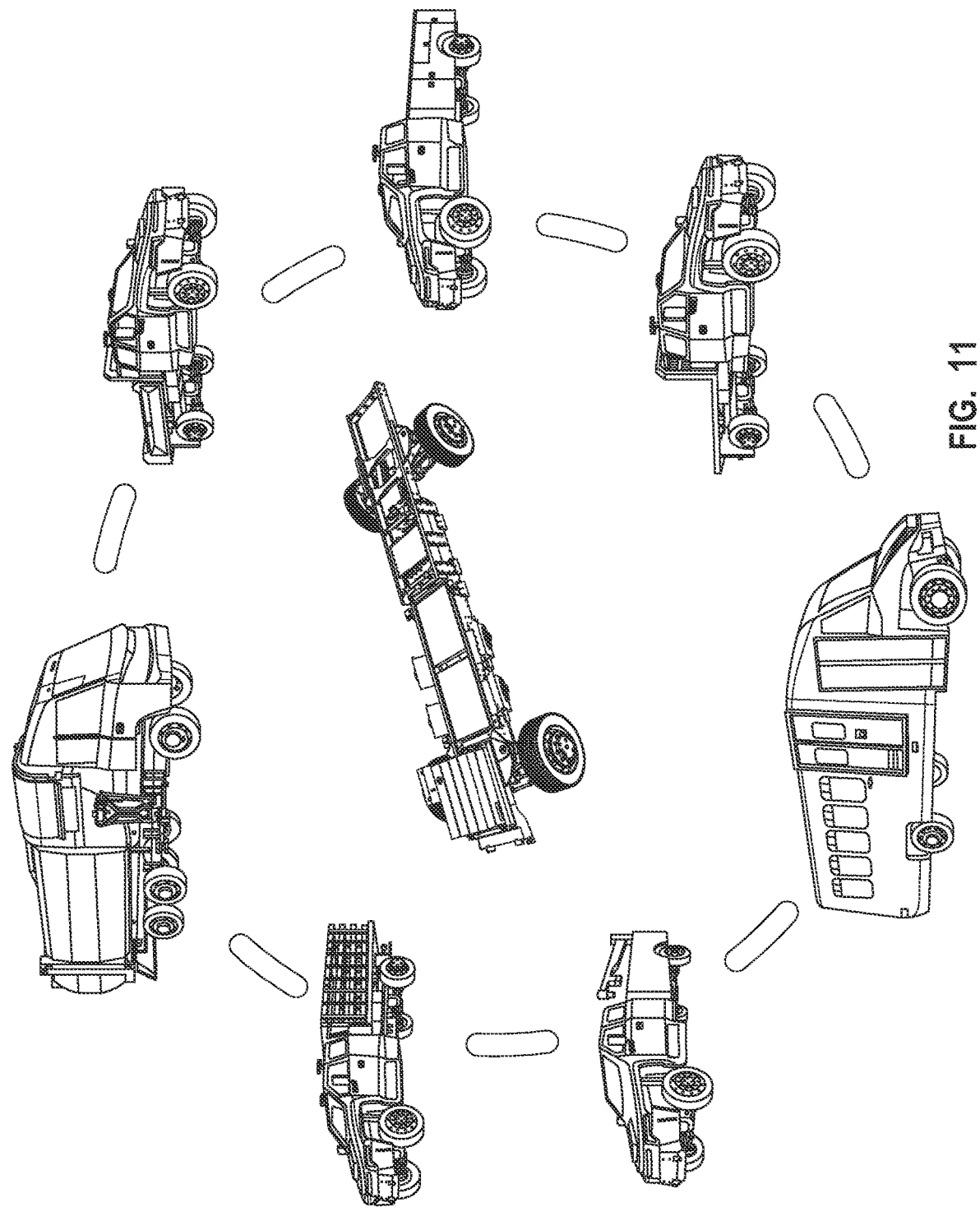
FIG. 11 is a schematic of different embodiments of a rear portion on an embodiment of a chassis as shown in FIG. 2.

FIGS. 10 and 11 show different various embodiments of configurable rear portions 110 with different cabs 102 that may be carried on the common chassis 120.

Figure 12:
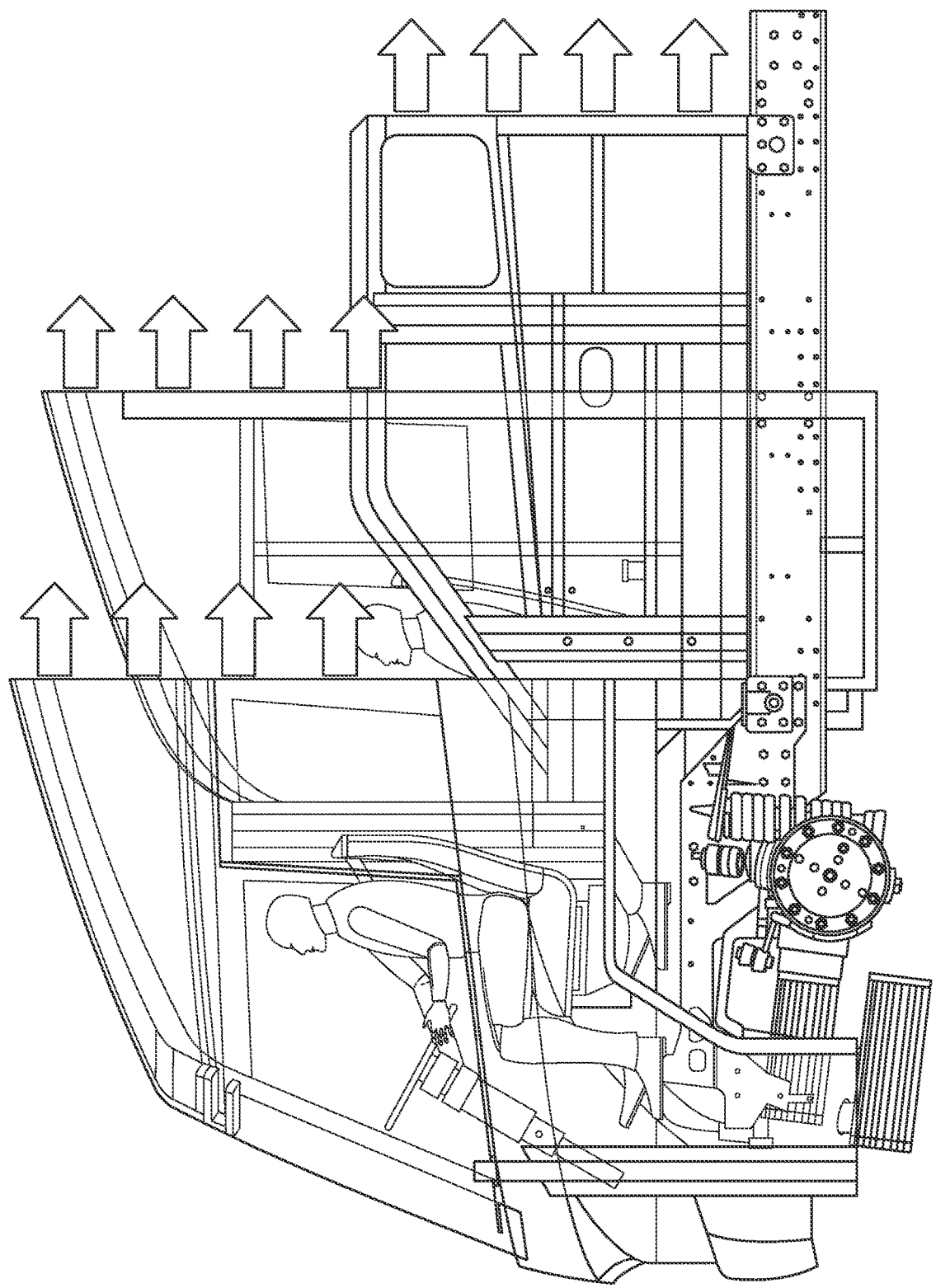
FIG. 12 is an overlay schematic of different embodiments of a cab portion with respect to a front portion of an embodiment of a chassis as shown in FIG. 2.

FIG. 12 shows the relative differences of different cabs 102 as mounted on an embodiment of the common chassis 120.

Figure 13:
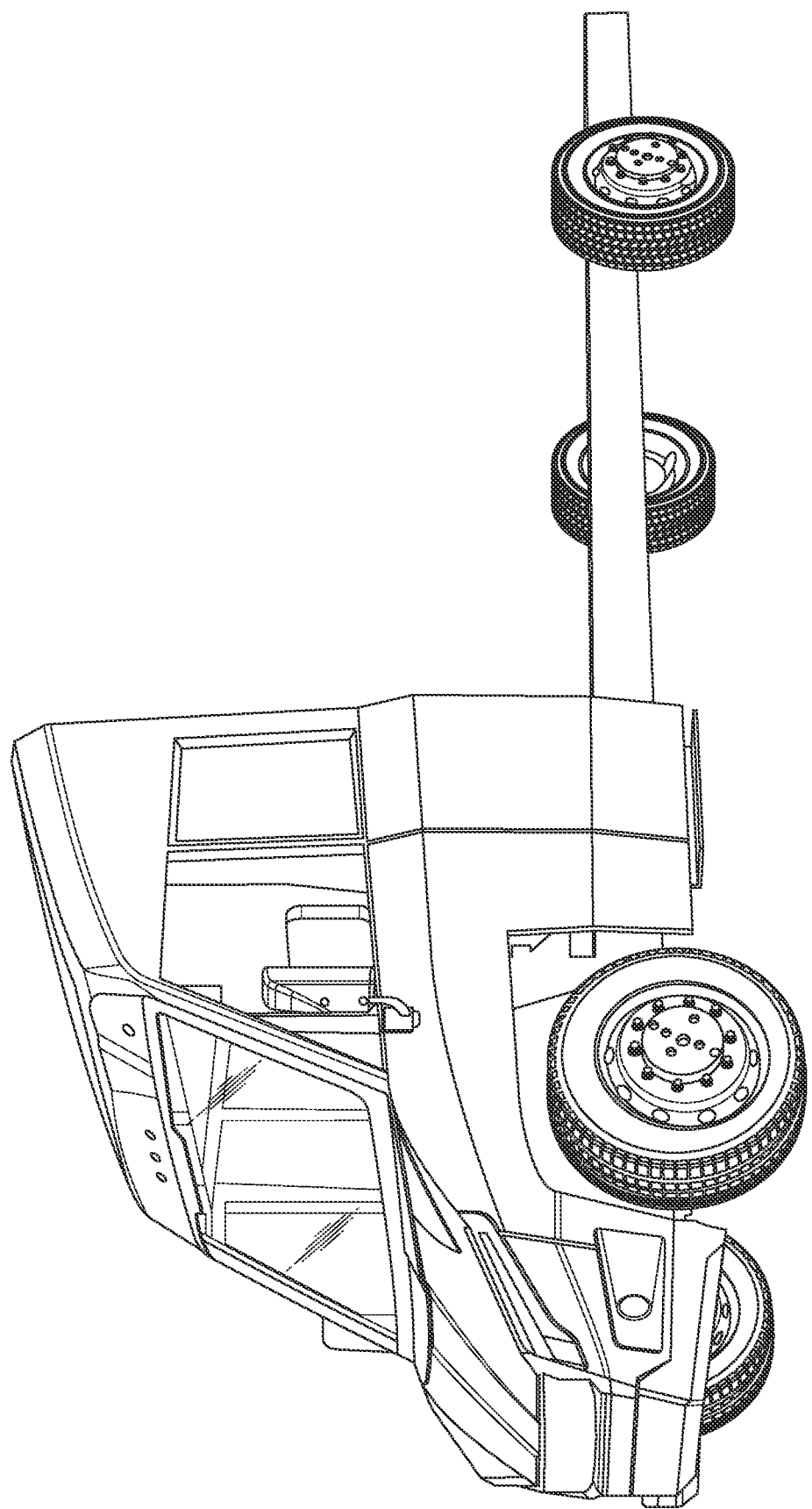
FIG. 13 is a perspective view of a low cab forward vehicle, according to an embodiment.

FIG. 13 is a schematic depiction of a low cab forward embodiment that would be utilized, for example, for cut-away and non cut-away applications to provide for enhanced cab visibility, multiple cab roof heights. In various embodiments, the low cab forward embodiment of cab 102 of FIG. 13 may be utilized with a transit bus rear portion 120. In various embodiments, the low cab forward embodiment of cab 102 of FIG. 13 is utilized with a front-wheel drive only configuration of chassis 120 as previously described. In various embodiments, the low cab forward embodiment of cab 102 of FIG. 13 can be configured for use as a recreational vehicle, a delivery vehicle, a transit bus or a special purpose custom rear portion 110.

Figure 14A:
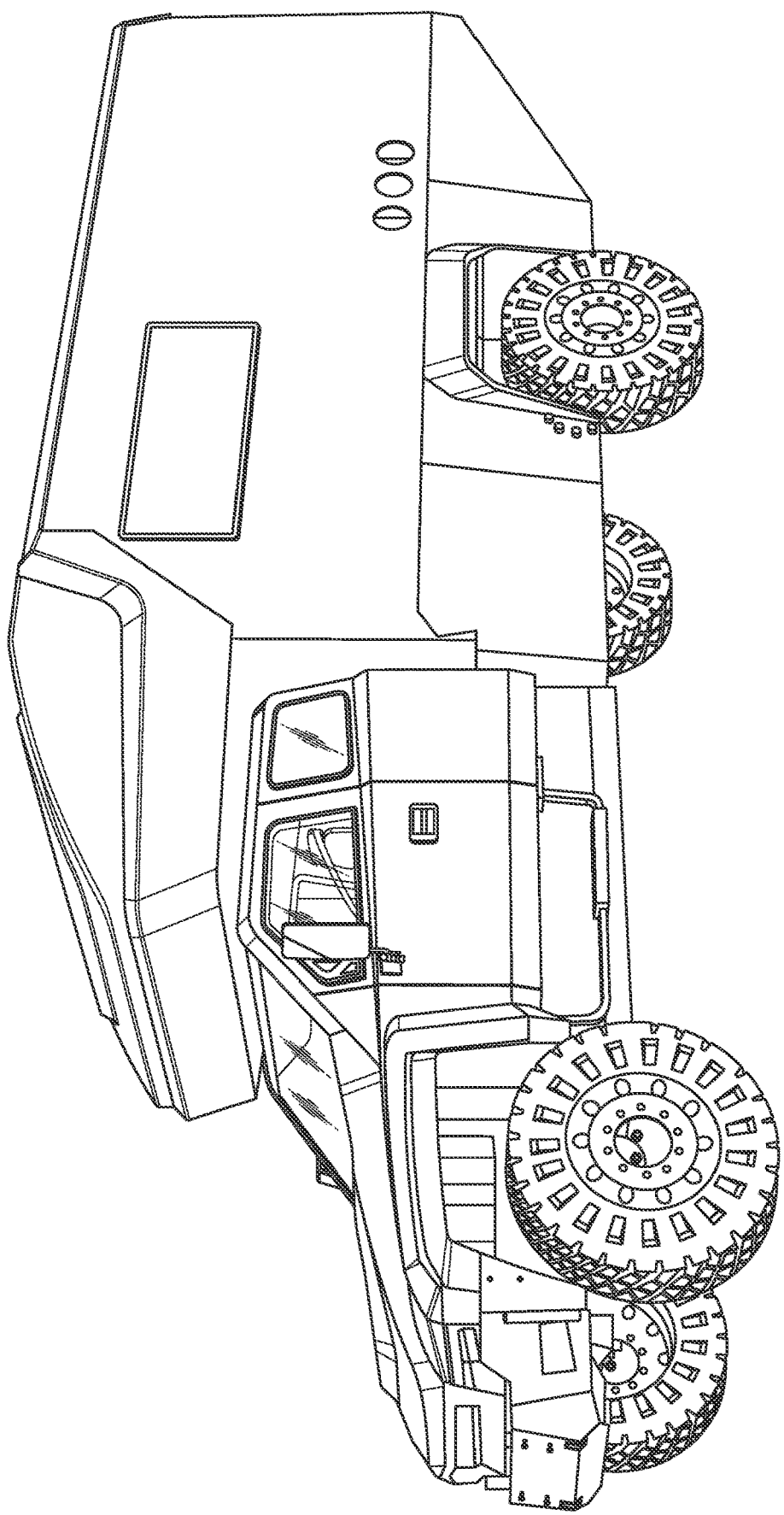
FIGS. 14A and 14B are each a perspective view of a conventional truck cab recreational vehicle, according to further embodiments.
Figure 14B:
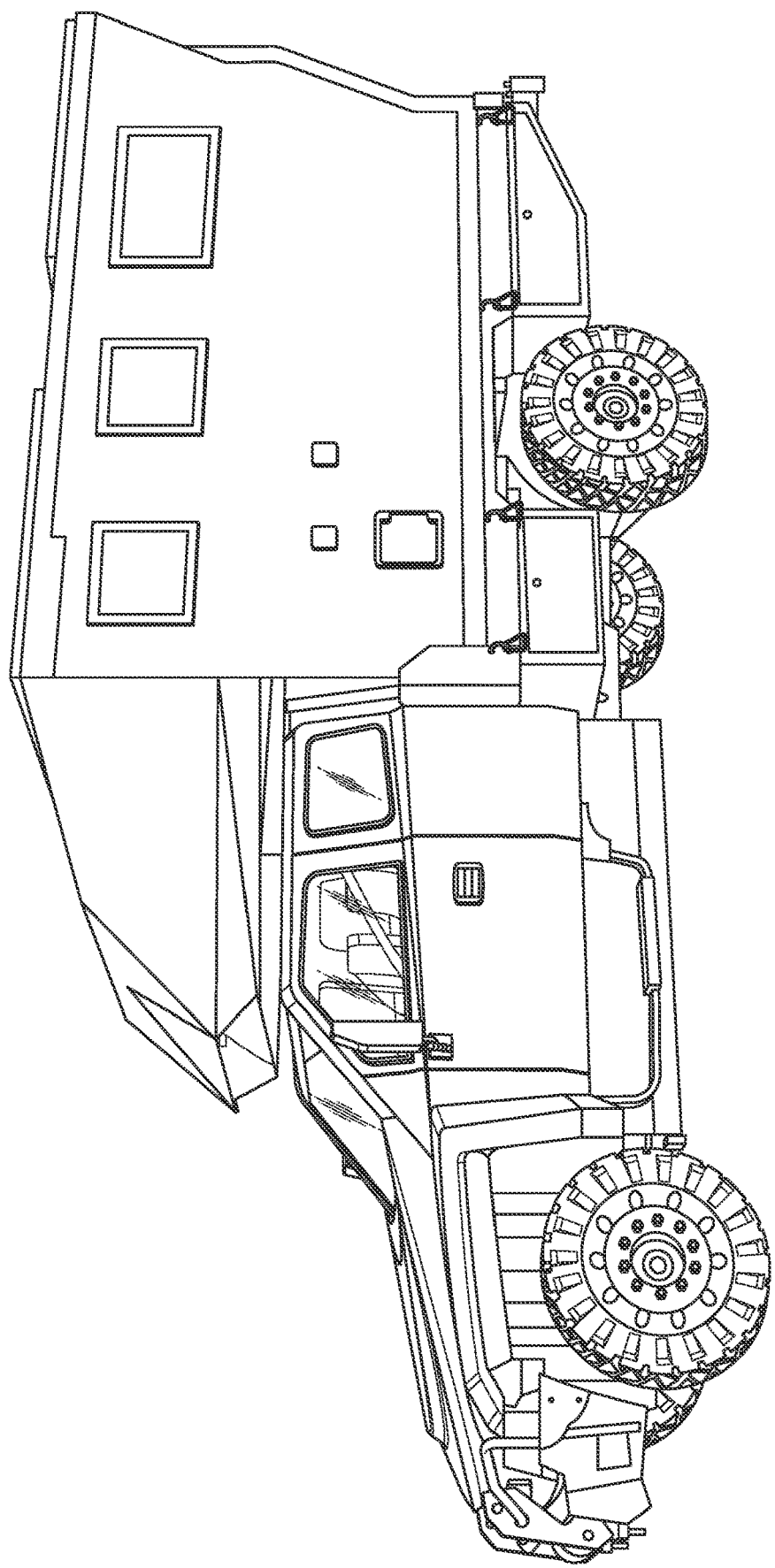

FIGS. 14A and 14B are schematic depiction of a conventional truck embodiment that would be utilized, for example, for overland embodiments, such as for custom recreational vehicles. In various embodiments, the conventional truck embodiment of cab 102 of FIGS. 14A and 14B can be utilized with an all-wheel drive only configuration of chassis 120 as previously described having independent front and rear suspensions.

Figure 2:
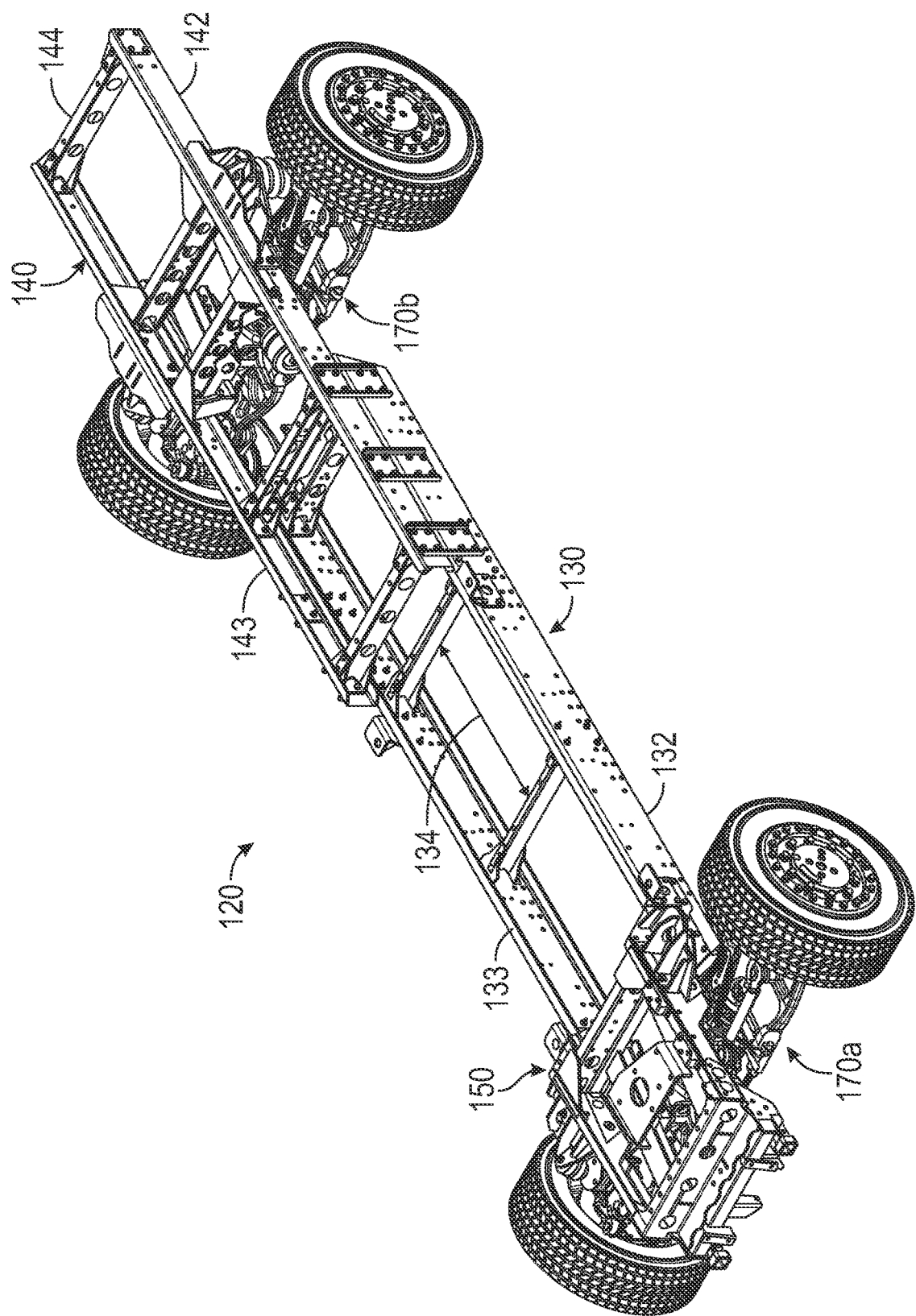
FIG. 2 is a perspective view of a chassis, according to an embodiment.
Figure 3:
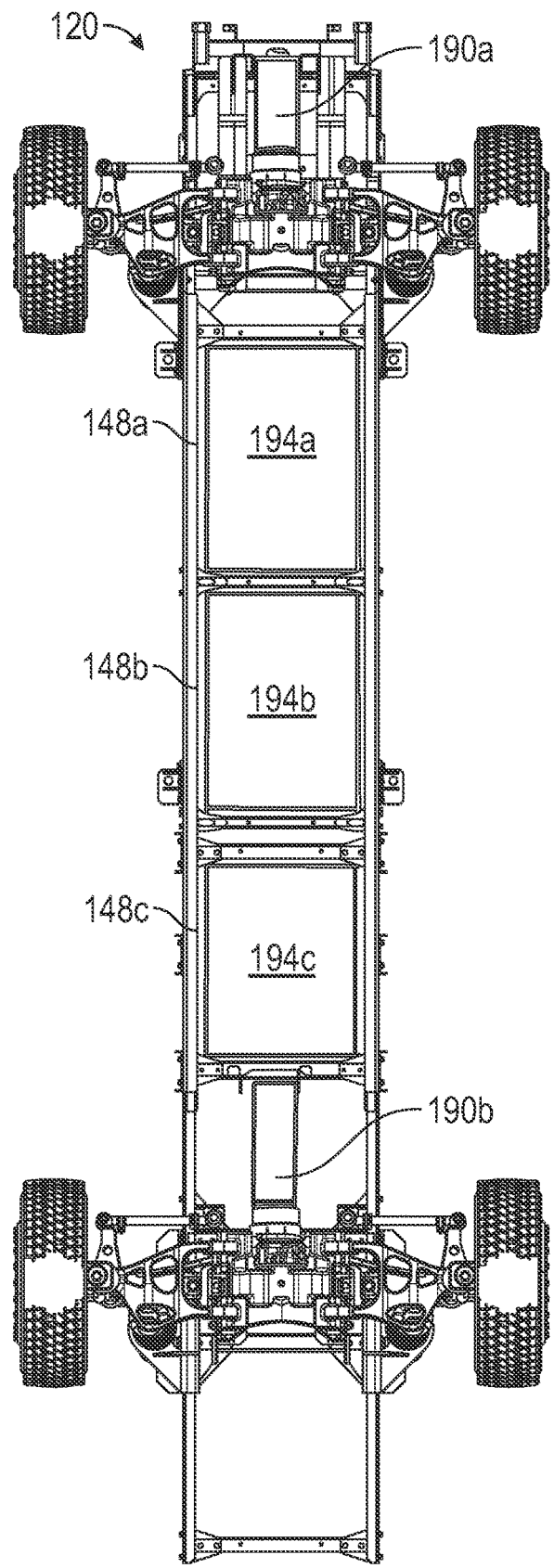
FIG. 3 is a bottom plan view of FIG. 3, with additional components depicted.
Figure 4:
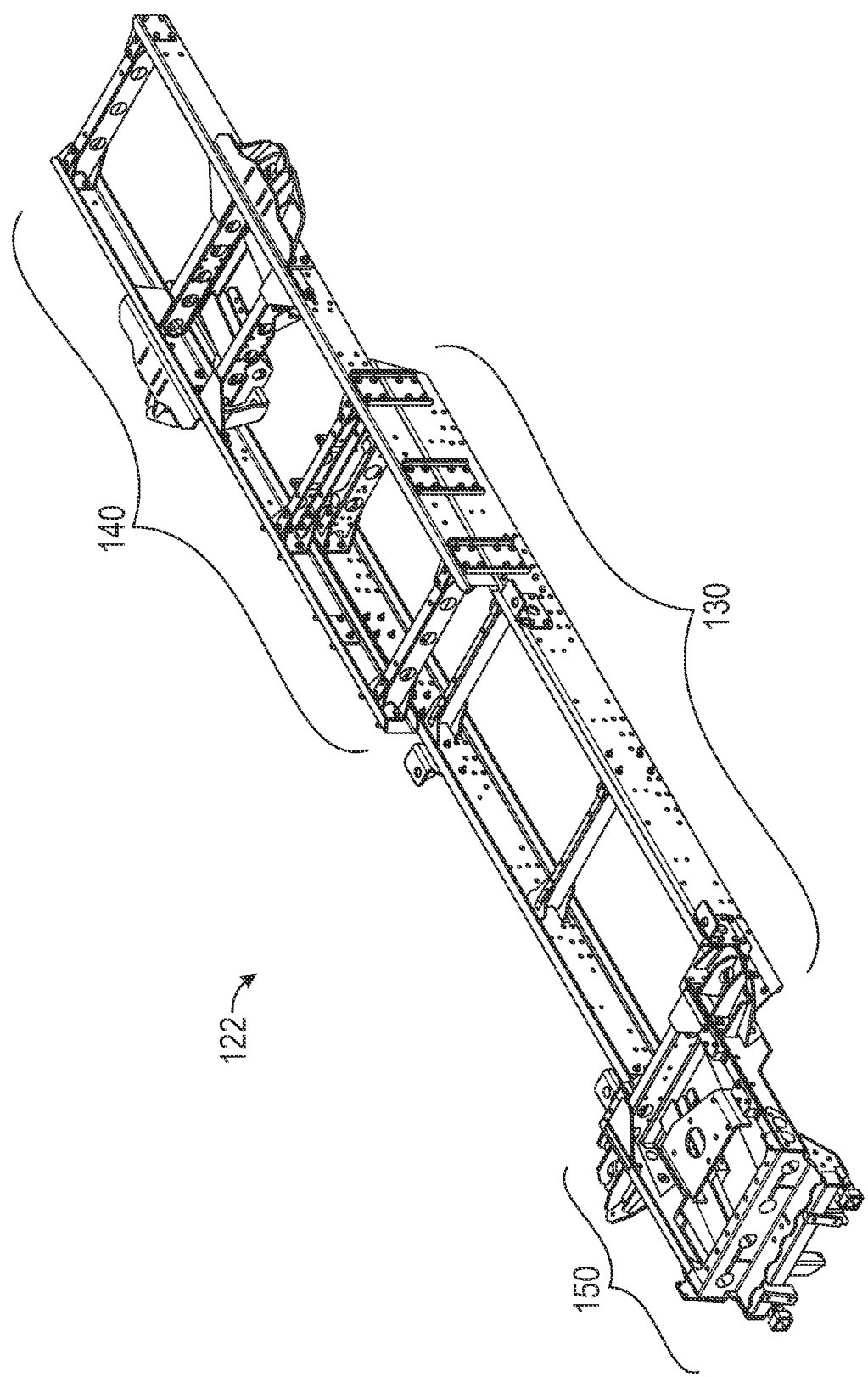
FIG. 4 is a perspective view of a frame, according to an embodiment.
Figure 5:
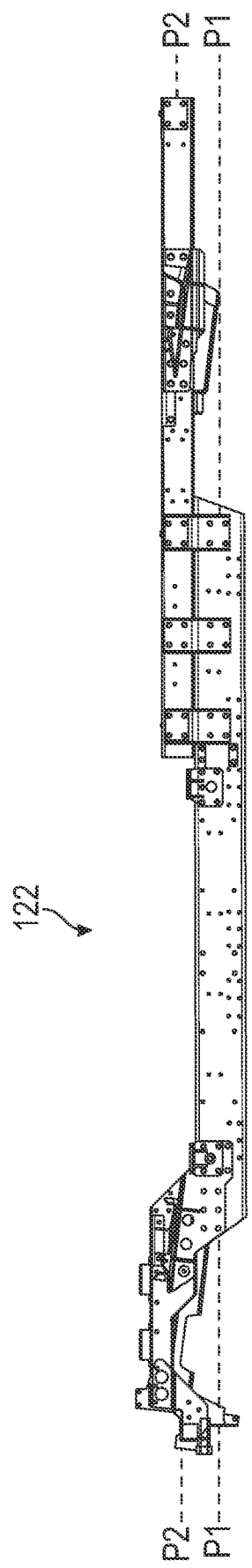
FIG. 5 is a left elevation view of FIG. 6.
Figure 6:
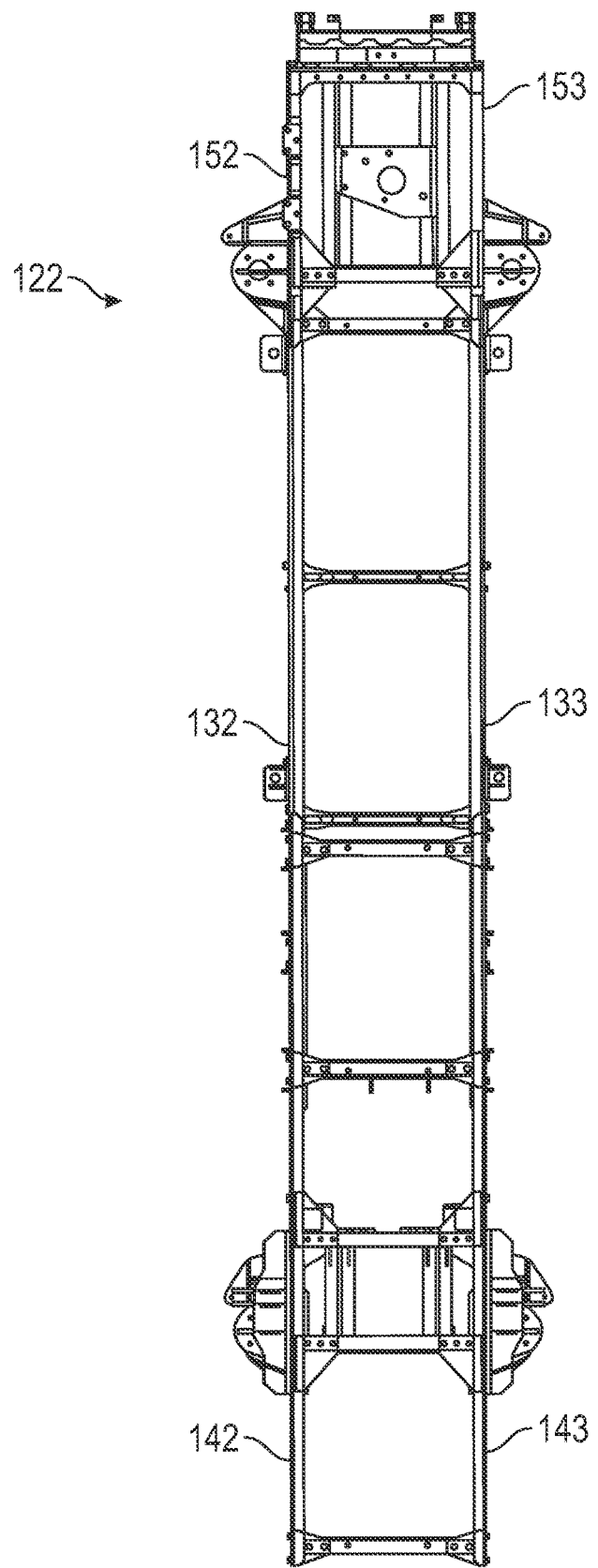
FIG. 6 is top plan view of FIG. 6.
Figure 7:
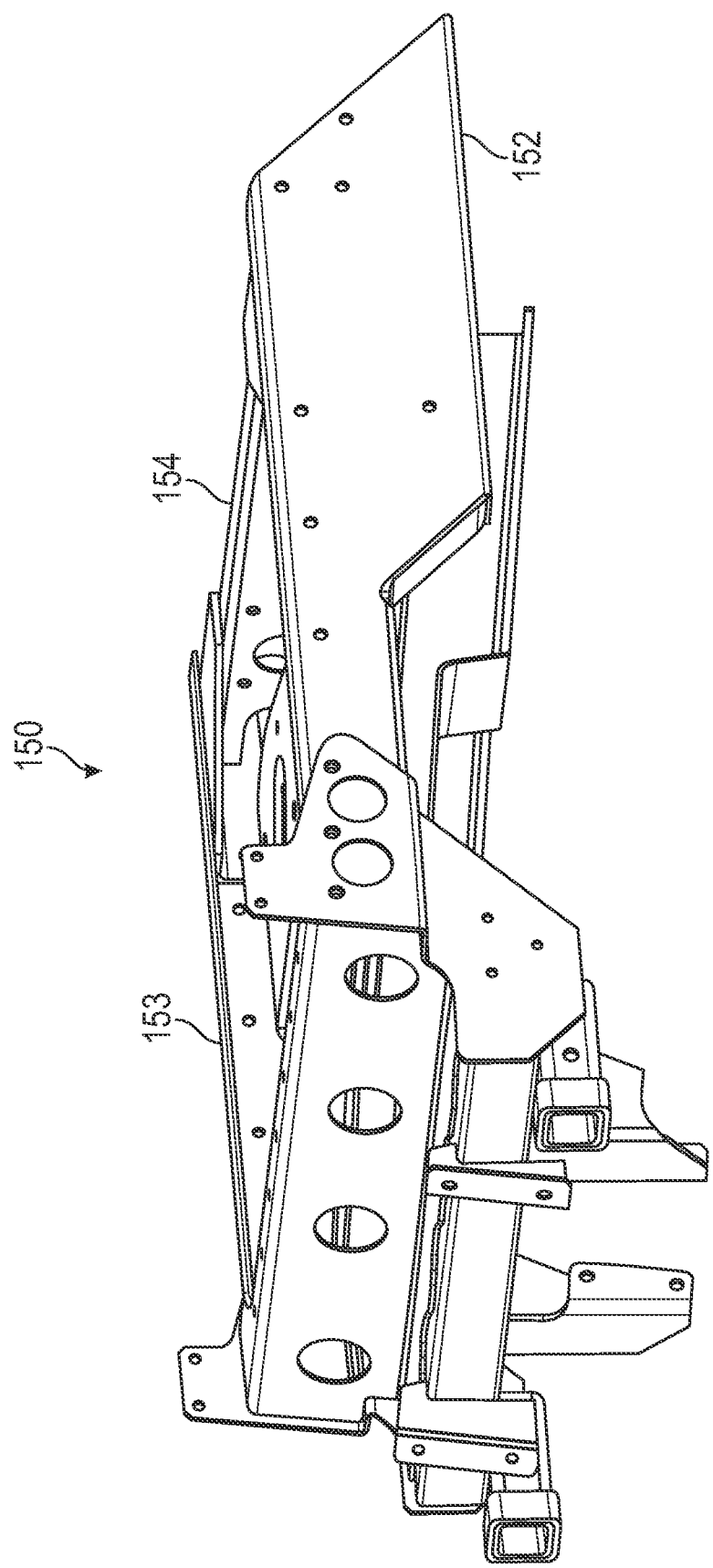
FIG. 7 is a perspective view of a front subframe, according to an embodiment.
Figure 15:
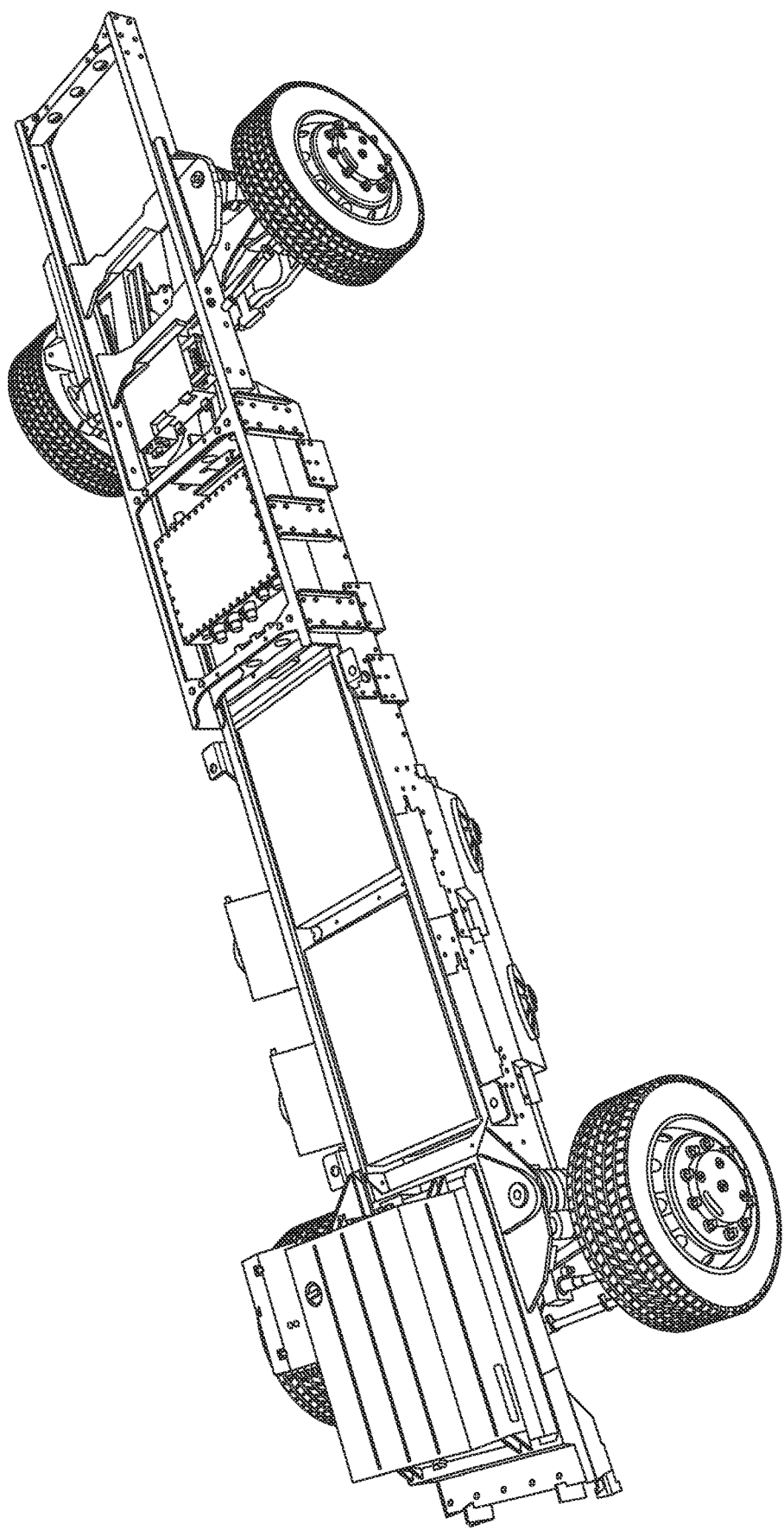
FIG. 15 is isometric perspective view of an embodiment of a chassis as shown in FIG. 2.
Figure 16:
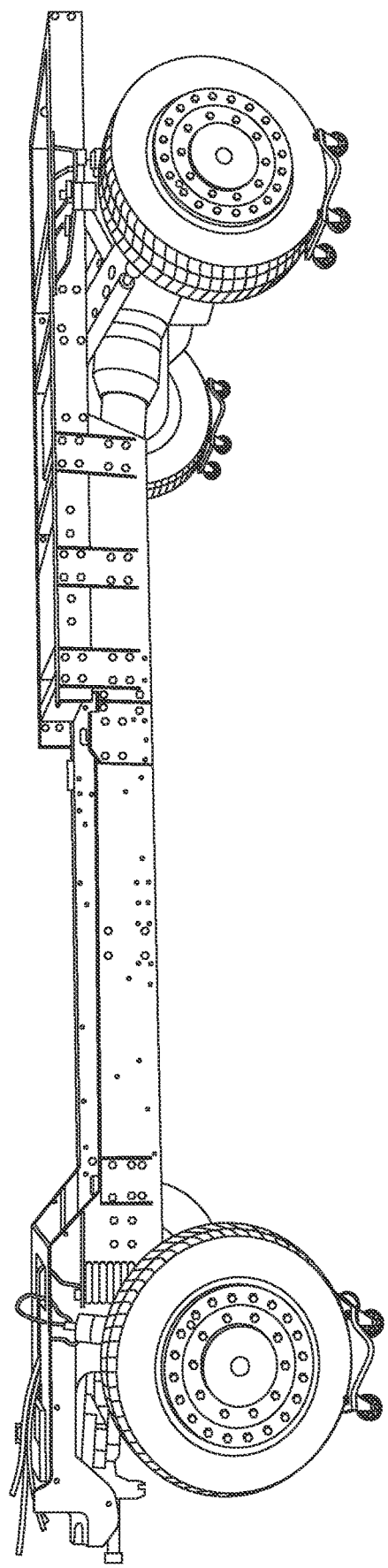
FIG. 16 is photographic side view of an embodiment of a chassis as shown in FIG. 2 with the battery units uninstalled.
Figure 17A:
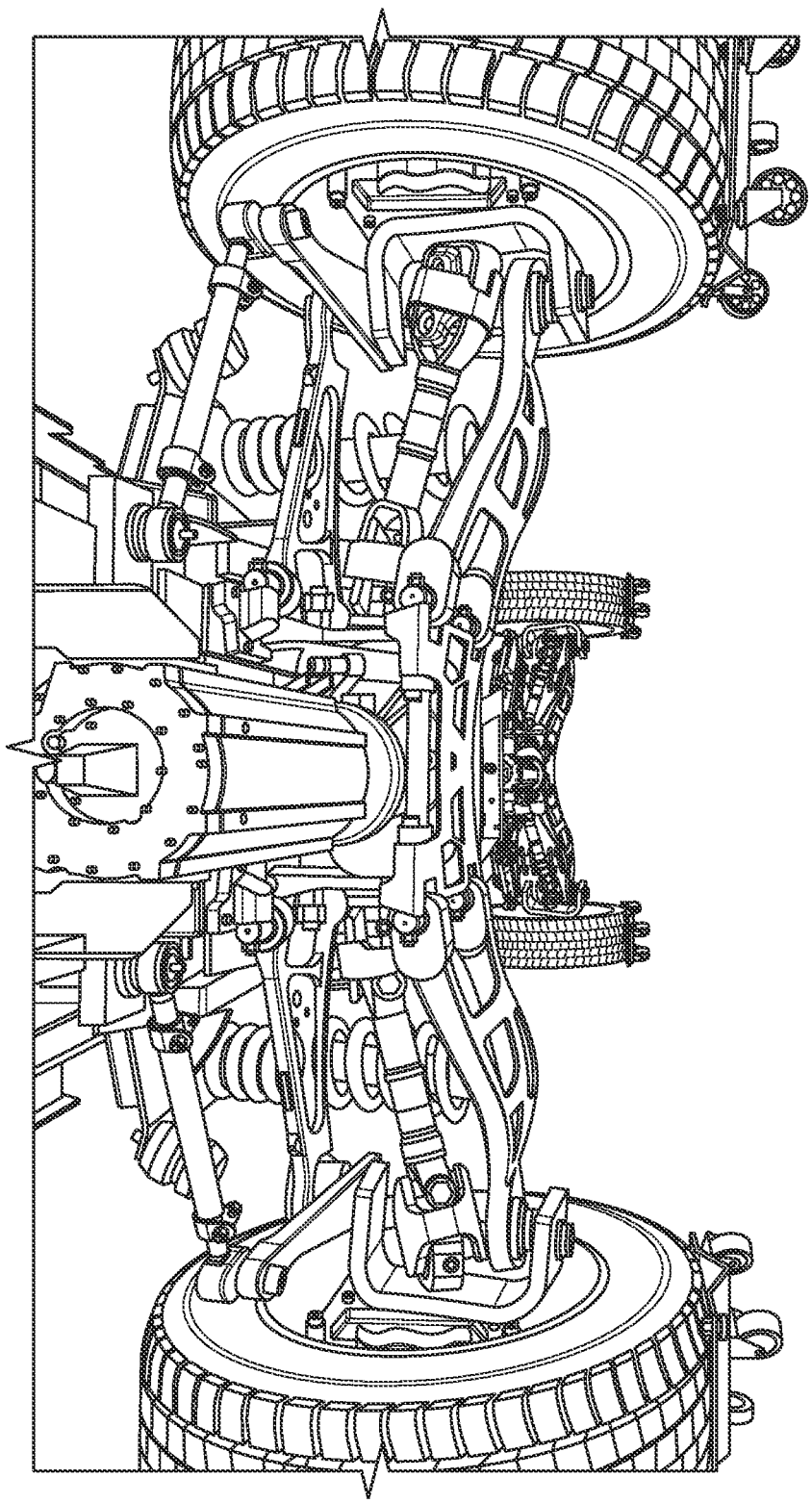
FIGS. 17A and 17B are a photographic front view and rear view, respectively, of an embodiment of a front portion of the chassis as shown in FIG. 2.
Figure 17B:
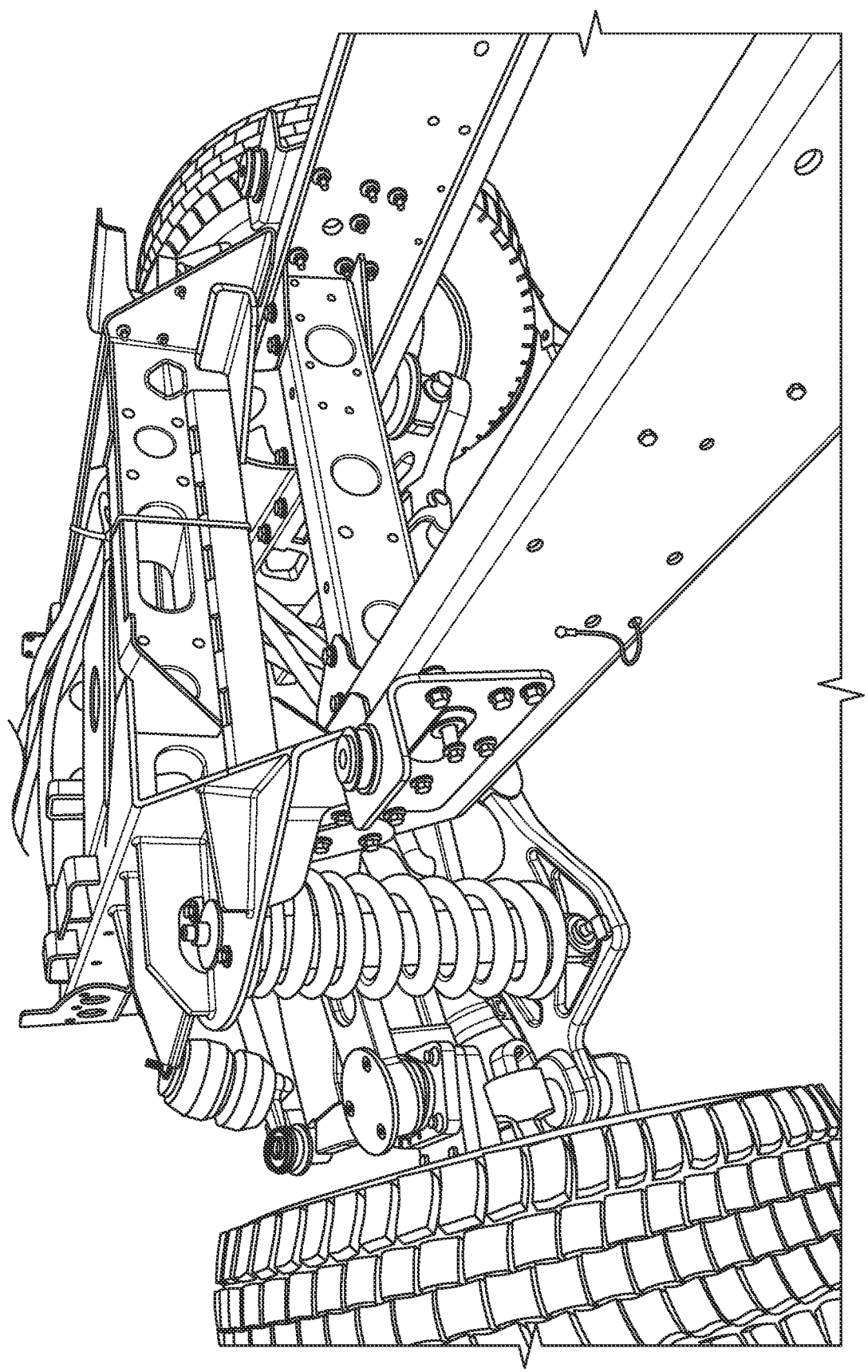
Figure 18A:
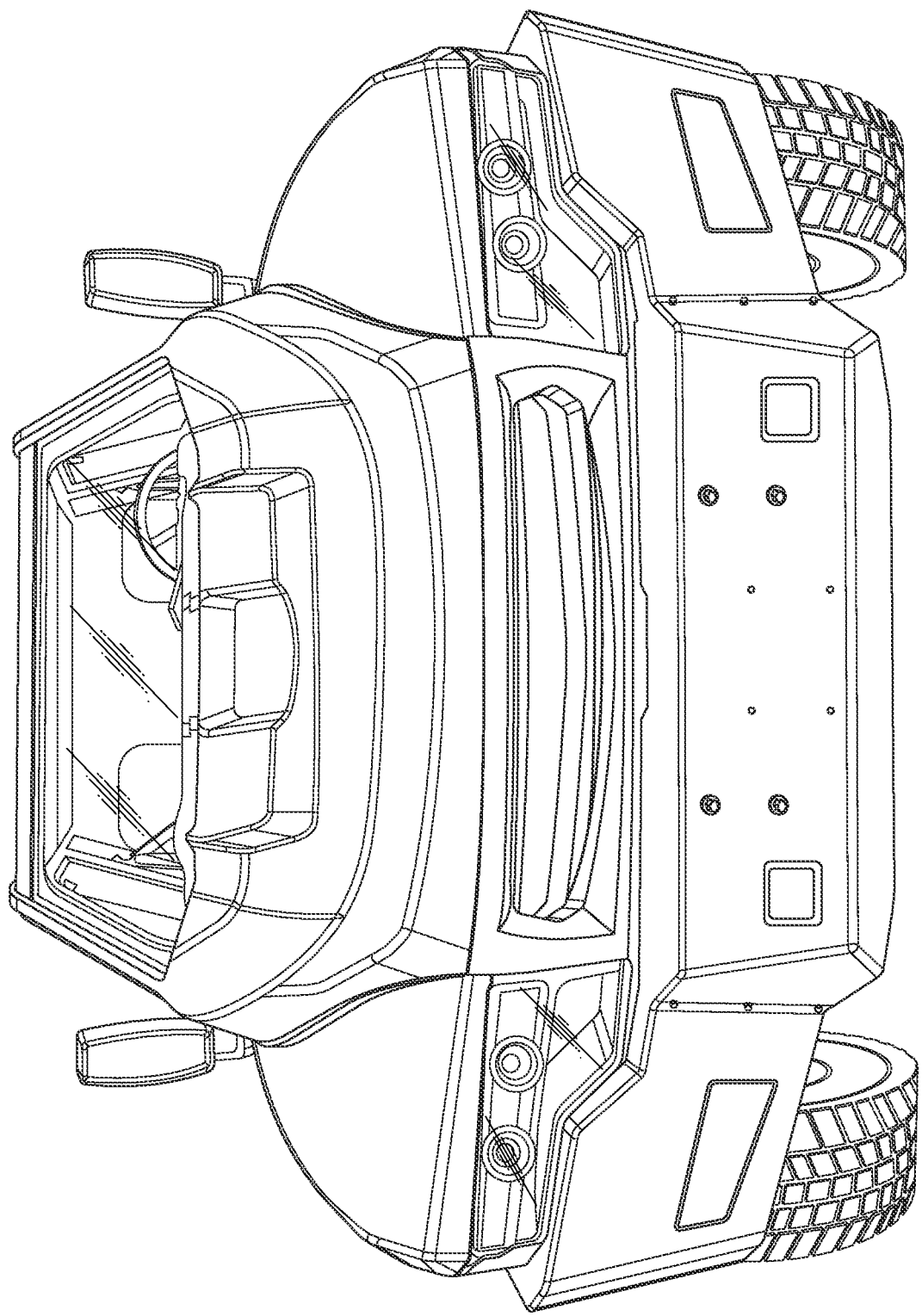
FIGS. 18A and 18B are a photographic side front view and rear view, respectively, of an embodiment of a cab chassis vehicle as shown in FIG. 1.
Figure 18B:
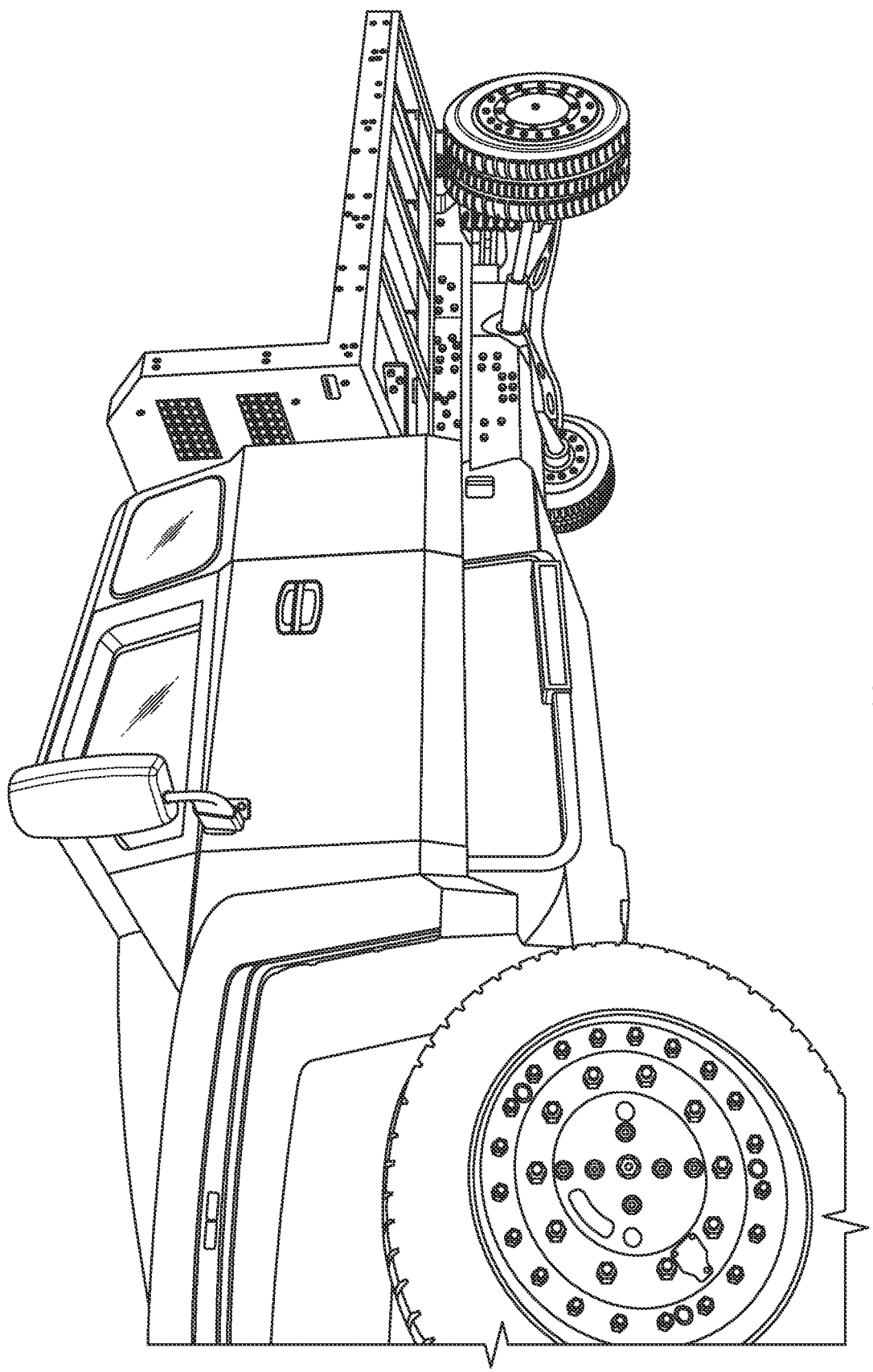

FIG. 15 is isometric perspective view of an embodiment of a chassis as shown in FIG. 2. FIG. 16 is photographic side view of an embodiment of a chassis as shown in FIG. 2 with the battery units uninstalled. FIGS. 17A and 17B are a photographic front view and rear view, respectively, of an embodiment of a front portion of the chassis as shown in FIG. 2. FIGS. 18A and 18B are a photographic side front view and rear view, respectively, of an embodiment of a cab chassis vehicle with a flat bed rear portion as shown in FIG. 1.

Figure 20A:
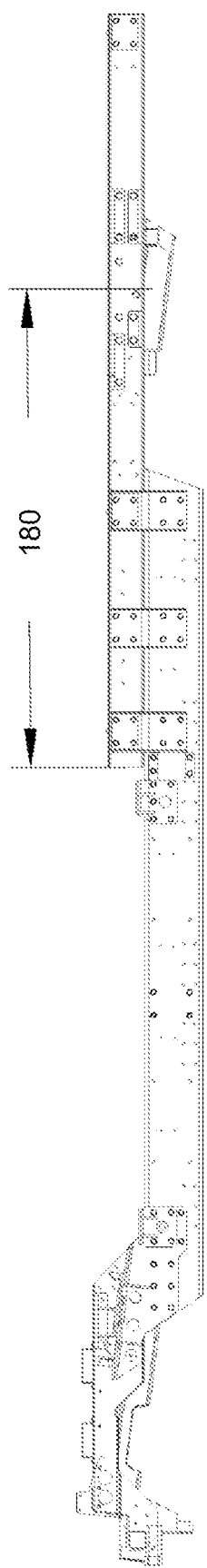
FIGS. 20A, 20B, and 20C are side views of a chassis assembly in three possible embodiments according to the position of a rear axle assembly.
Figure 20B:
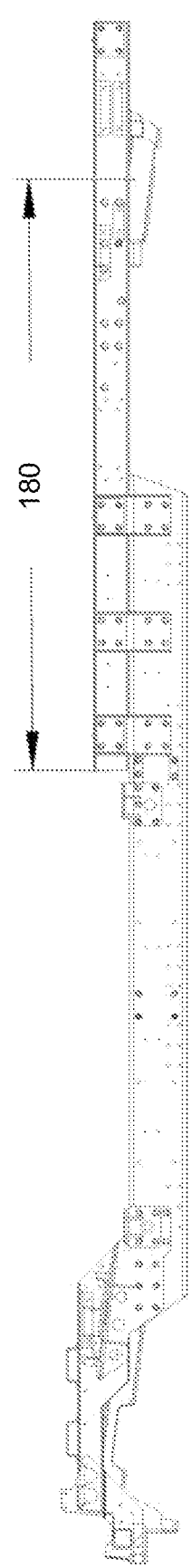
Figure 20C:
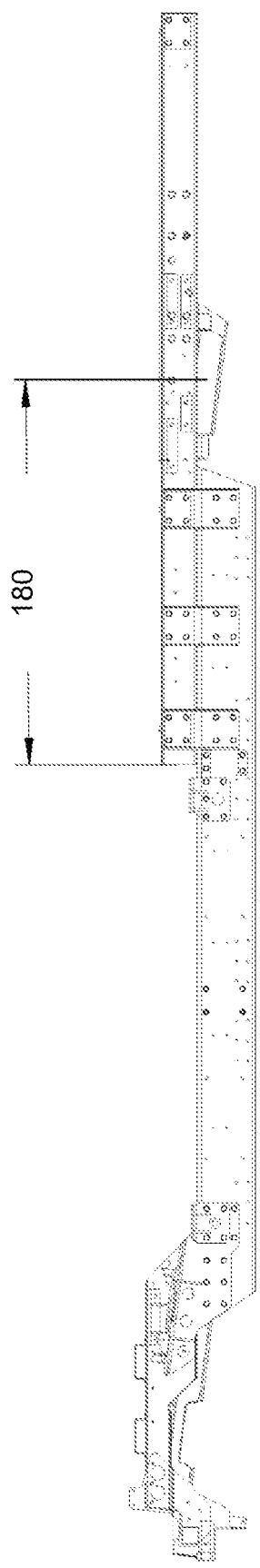
Figure 21A:
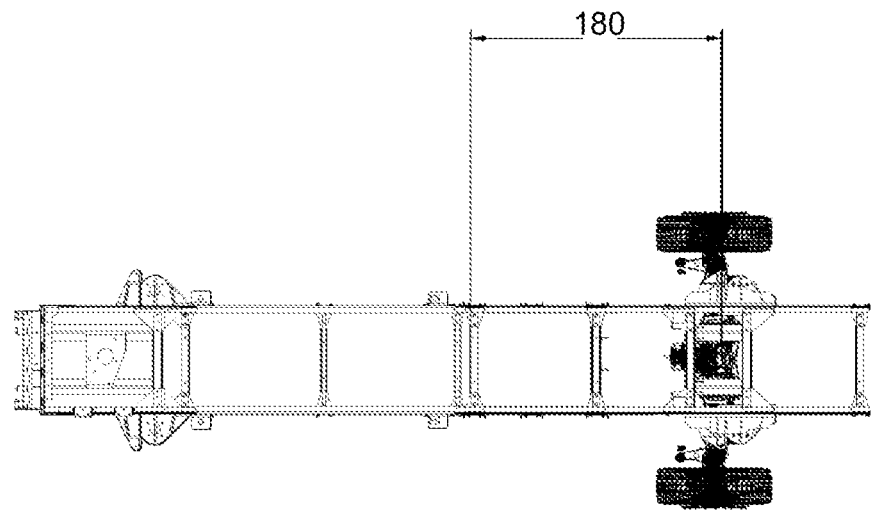
FIGS. 21A, 21B, and 21C are top views of the embodiments in FIGS. 20A, 20B, and 20C with a rear axle assemblies visible.
Figure 21B:
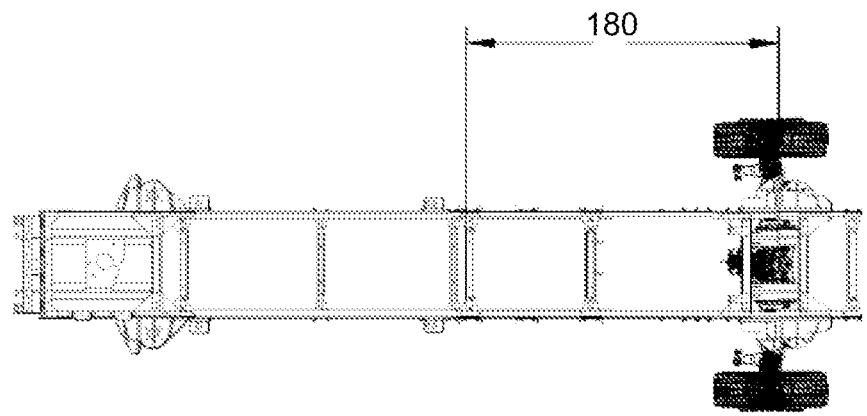
Figure 21C:
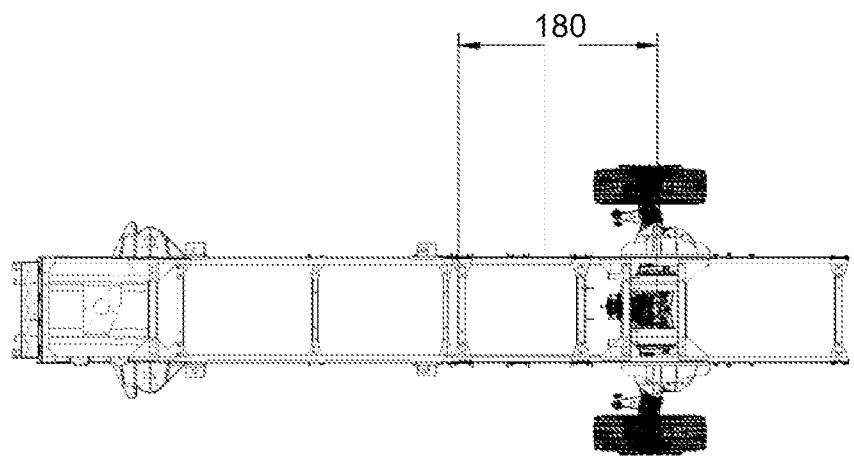

Referring now to FIGS. 20A, 20B, 20C, 21A, 21B, and 21C, FIGS. 20A, 20B, and 20C are side views of three possible embodiments of an axle assembly 170 in three positions on the chassis 120. FIG. 20A is the axle assembly 170 in a generally central longitudinal position within the side rails 142, 143 of the rear subframe 140. FIG. 20B is the axle assembly 170 in a generally aft longitudinal position within the side rails 142, 143 of the rear subframe 140. FIG. 20C is the axle assembly 170 in a generally forward longitudinal position within the side rails 142, 143 of the rear subframe 140. FIGS. 21A, 21B, and 21C are top views of three possible embodiments of an axle assembly 170 in three positions on the chassis 120. FIG. 21A is the axle assembly 170 in a generally central longitudinal position within the side rails 142, 143 of the rear subframe 140. FIG. 21B is the axle assembly 170 in a generally aft longitudinal position within the side rails 142, 143 of the rear subframe 140. FIG. 21C is the axle assembly 170 in a generally forward longitudinal position within the side rails 142, 143 of the rear subframe 140. Advantages of the modularity of the position of the axle assembly 170 include the ability to customize the center of gravity between the axles depending on the vocation of the vehicle or expected payload distribution and increased ease of servicing parts on the chassis 120, rear subframe 140, axle assembly 170, and others.

Figure 22A:
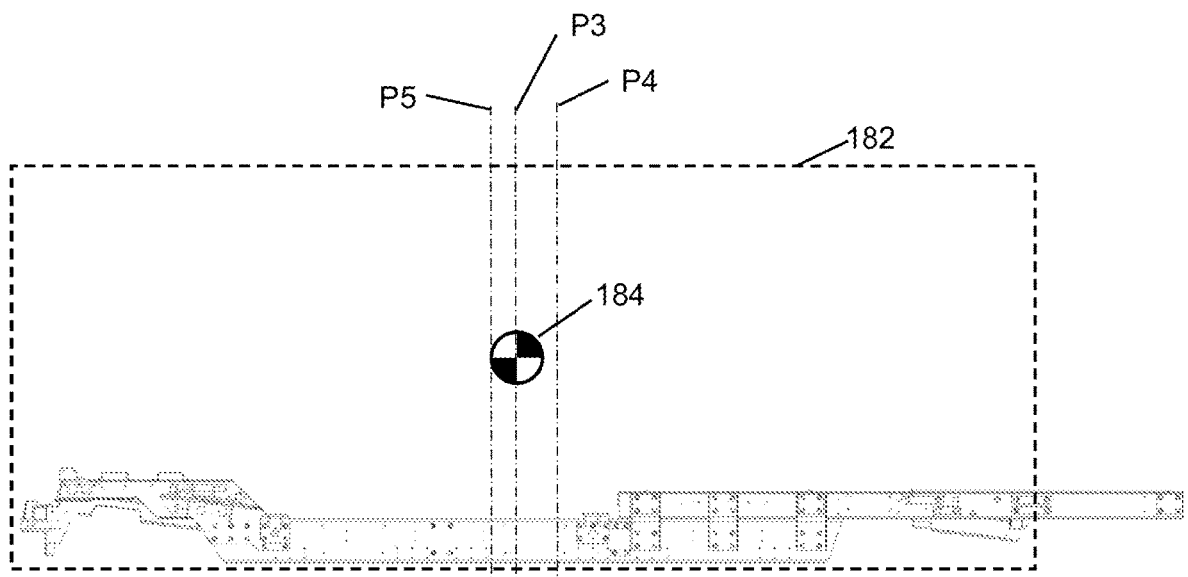
FIGS. 22A, 22B, and 22C are side views of a chassis assembly in three possible embodiments according to the position of a rear axle assembly with the approximate center of gravity of the truck shown.
Figure 22B:
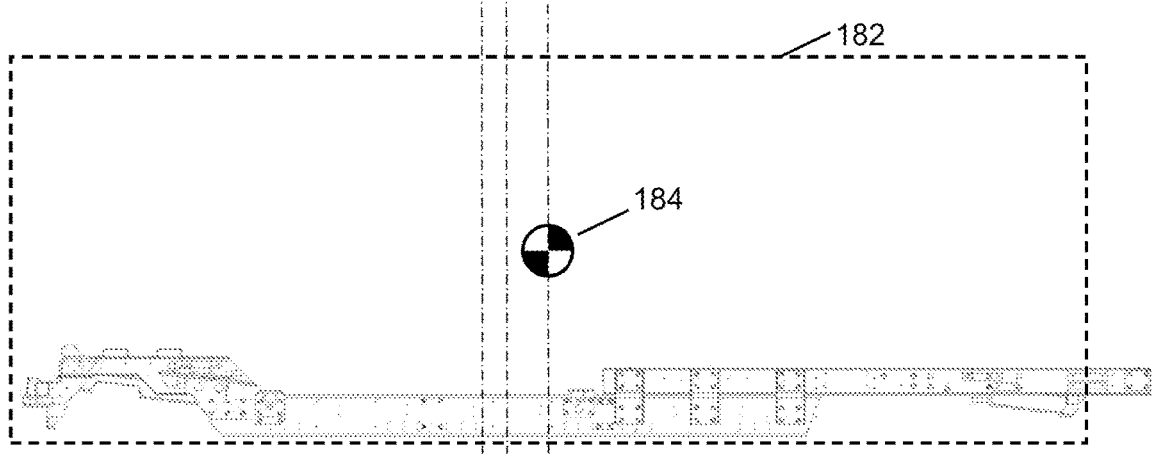
Figure 22C:
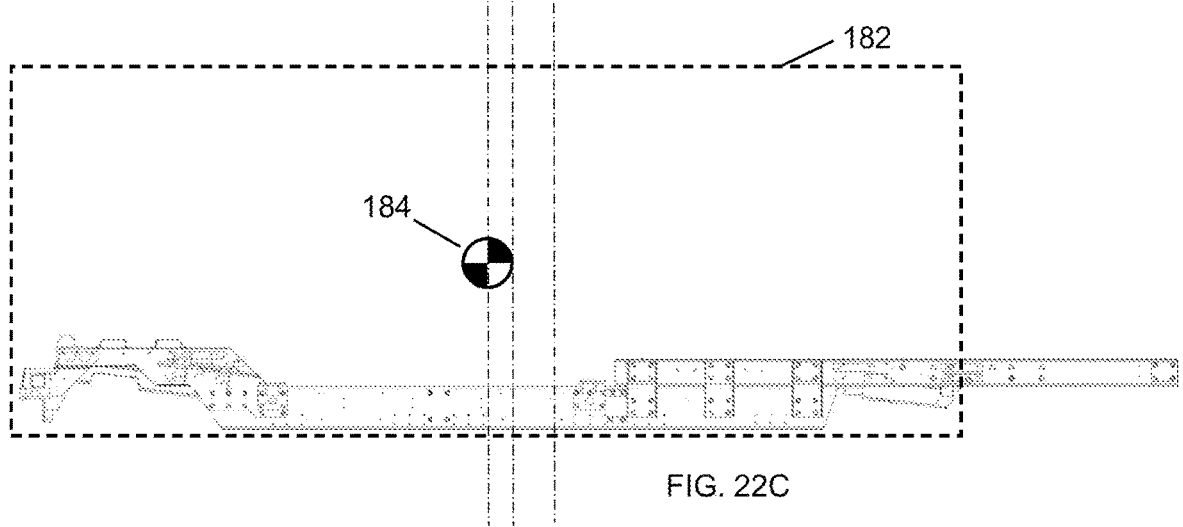

Referring now to FIGS. 22A, 22B, and 22C, an approximate perimeter 182 of the area where the mass of a fully configured and loaded truck acts to create a weight force upon the ground is shown in dashed lines. The position of the axle assembly 170 effectively determines the longitudinal length of the approximate perimeter 182. The position of axle assembly 170, in turn, effectively determines the longitudinal position of center of gravity 184 of the truck 100. As shown in the embodiments, the center of gravity 184 can lie on plane P3 when the axle assembly 170 is in a generally central longitudinal position within the side rails 142, 143 of the rear subframe 140. Further, the center of gravity 184 can lie on plane P4 when the axle assembly 170 is in a generally aft longitudinal position within the side rails 142, 143 of the rear subframe 140. The center of gravity 184 may also lie on plane P5 when the axle assembly 170 is in a generally forward longitudinal position within the side rails 142, 143 of the rear subframe 140. It should also be noted that changing the position of axle assembly 170 within the rear subframe 140 is not the only way of achieving a change in the longitudinal position of the center of gravity 184.

Figure 23:
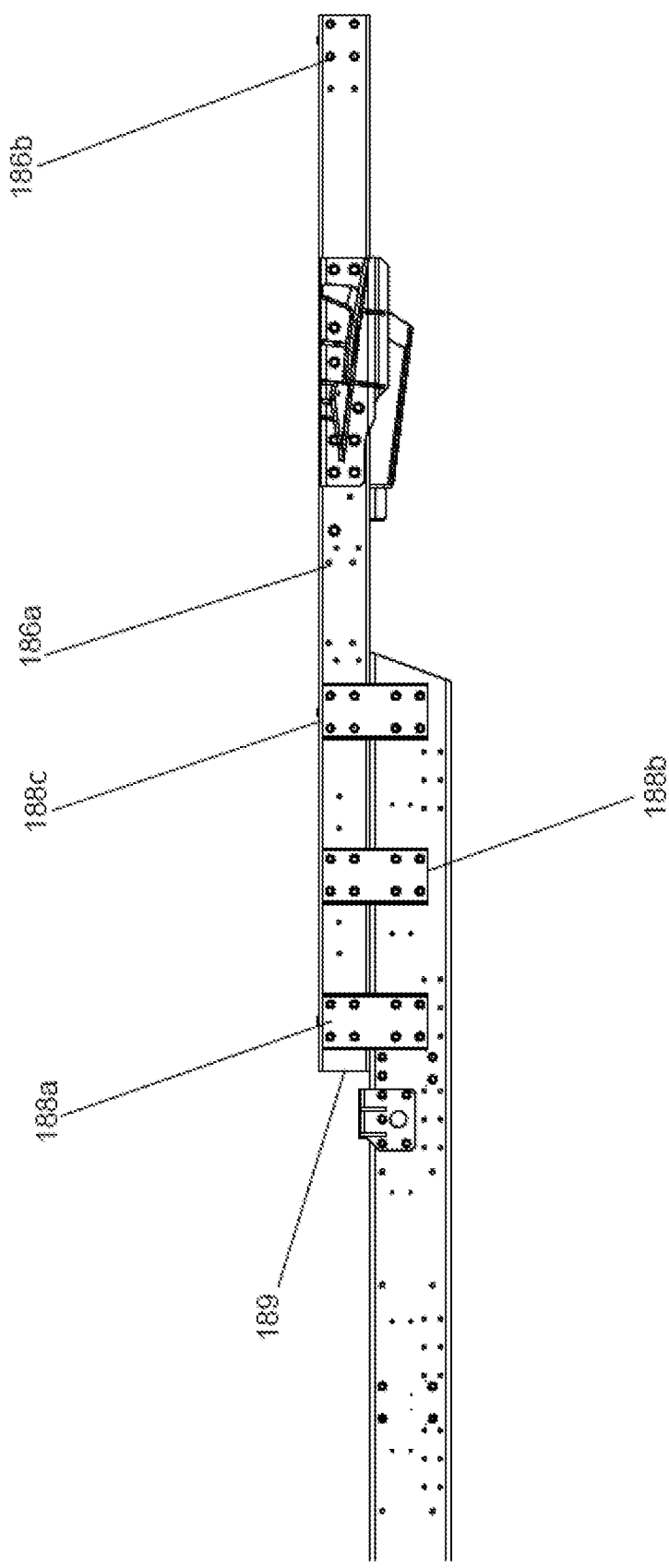
FIG. 23 is a detail view of FIG. 20A.

FIG. 23 is a detail view of the rear subframe 140 of FIG. 20A, where the axle assembly 170 is in a generally central longitudinal position within the rear subframe 140. The axle assembly 170 is removably attachable to the rear subframe 140 in this embodiment by use of bolt holes 186a, 186b. Bolt holes 186a, 186b in this embodiment are variably sized through holes designed to receive a threaded bolt that uses a nut to affix the axle assembly 170 in place. As can be seen in FIG. 23, a multitude of bolt holes 186 are pre-drilled and can exist while not in use, such that the longitudinal position of rear axle assembly 170 can be relatively easily varied according to the vocation of the truck 100 based on the specific rear payload module, for example, that may be configured on the rear subframe 140.

As shown by FIGS. 22A, 22B, and 22C, by having bolt holes 186 present in the desired pattern such that a plurality of patterns exist on rear subframe 140 ready to receive the axle assembly 170, the center of gravity can be varied according to the vocation and envisioned weight distribution of the truck 100. Further, in the embodiment shown in FIG. 23, plates 188a, 188b, and 188c are employed to affix the rear subframe 140 to the central frame portion 130. The forward-most point 189 of the rear subframe 140 generally describes the limit of how far aft the cab 102 can be configured. The rear subframe 140 is affixable to the central frame portion 130 using at least one plate 188 employing bolts through a plurality of bolt holes 186 in a pattern such that the bolt holes 186 of the central frame portion 130 and the rear subframe 140 line up with the bolt holes 186 of the at least one plate 188, and by having a multitude of bolt holes 186 in this pattern, the relative longitudinal position of the rear subframe 140 to the central frame portion 130 can be varies, which in turn will change the center of gravity 184 to a desired longitudinal position and allow the longitudinal position or length of the cab 102 to be varied as well.

Figure 24:
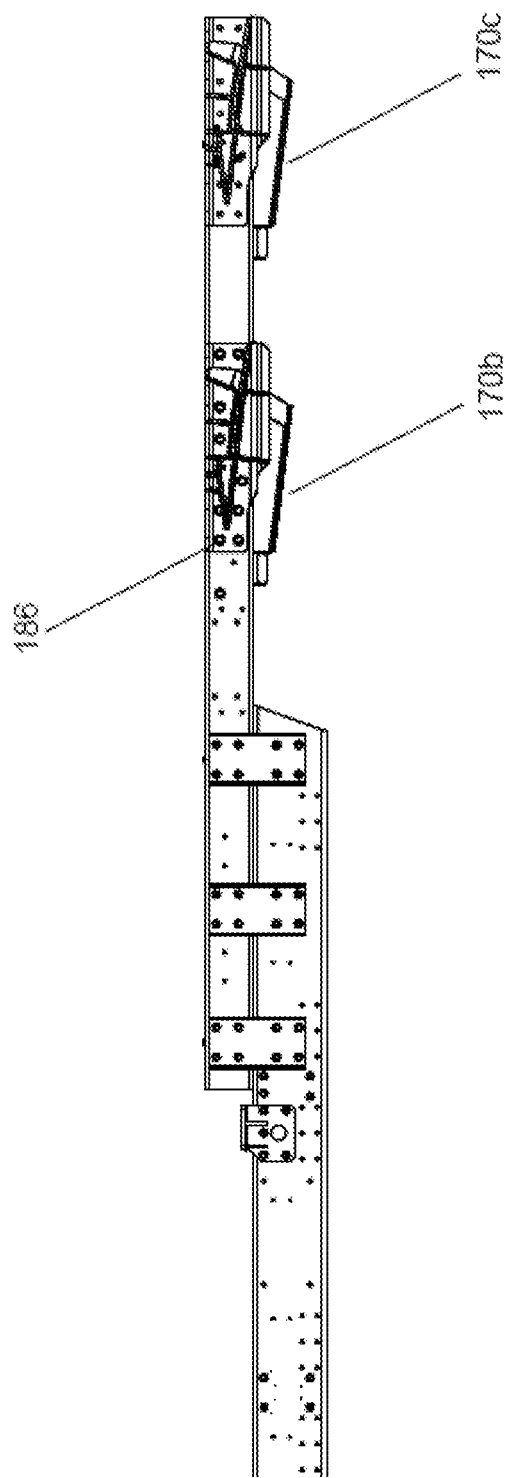
FIG. 24 is the detail view of FIG. 23 in a different embodiment.

As can be seen in FIG. 24, the bolt holes 186 can be arranged in predetermined patterns such that a set of more than one axle assembles 170b, 170c are affixable to the rear subframe 140 simultaneously, as needed for whatever vocation the truck 100 is employed to do. It is further contemplated that the side rails 142, 143 can be fabricated at different lengths longitudinally to accommodate more of the patter of bolt holes 186 that accommodate an axle assembly 170 such that either more axle assemblies 170 can be added, or the longitudinal distance between the axle assemblies 170 can be varied according to common weight distributions in the payloads of different vocations or rear payload modules. For example, the embodiment of FIG. 24 comprises side rails 142, 143 of a length of 8 feet longitudinally, and with two sets of pre-drilled patterns of bolt holes 186 that accommodate an axle assembly 170. In another embodiment, the side rails 142, 143 are 16 feet in length longitudinally, with 4 sets of pre-drilled patterns of bolt holes 186 that accommodate an axle assembly 170. In another embodiment, the side rails 142, 143 are 24 feet in length longitudinally, with 6 sets of pre-drilled patterns of bolt holes 186 that accommodate an axle assembly 170. Although it is of course possible to drill more holes in the side rails 142, 143 after fabrication, the embodiments described herein have pre-drilled sets in order to allow a manufacturer or seller to warrant the integrity of the side rails 142, 143 and indeed the entire chassis 120 and, by extension, truck 100.

Similarly, the pattern of the bolt holes 186 that accommodates the at least one plate 188 are pre-drilled in a square manner, although other pattern shapes are contemplated. The pattern of the bolt holes 186 that accommodates a plate 188 in the embodiment of FIG. 23 is four bolt holes 186 in a generally square configuration, with the corner of each square consisting of a center of one bolt hole 186, and each corner approximately 3 inches away from the bolt hole 186 which lies along a side of the square such that the two bolt holes 186 describe one side of the square. Each plate 188 has two of these patterns of bolt holes 186 pre-drilled with one pattern at each end, such that the side rails 142, 143 can be affixed to the central frame portion 130. Again, these patterns of bolt holes 186 are pre-drilled in order that a manufacturer or seller is able to warrant the integrity of the chassis 120 and, by extension, the truck 100.

Submitted with U.S. Provisional Application No. 63/229,979 as Appendix A that is incorporated by reference herein are certain materials that were made publicly available by, for, or from the inventors and assignees hereof not more than one-year prior to the effective filing date hereof and are therefore subject to the exceptions to prior art as set forth in 35 U.S.C. § 102(b)(1)(A).

Submitted with U.S. Provisional Application No. 63/229,979 as Appendix B that is incorporated by reference herein are certain redacted confidential materials with respect to offers for sale made by, for, or from the inventors and assignees hereof not more than one-year prior to the effective filing date hereof and are therefore subject to the exceptions to prior art as set forth in 35 U.S.C. § 102(b)(1)(A).

Submitted with U.S. Provisional Application No. 63/229,979 as Appendix C that is incorporated by reference herein is a copy of a previously filed provisional application, Application Ser. No. 63/190,474, entitled "Universal Chassis Frame for Medium-Duty Configurable Electric Trucks," filed on May 19, 2021, by the assignee of the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A universal chassis frame for a configurable electric truck having a gross vehicle weight rating in a range above 10,000 lbs with the chassis frame configured to interface with any of a set of multiple configurable rear payload modules, the universal chassis frame comprising:
   a central frame having a pair of main frame rails configured to support at least two battery modules within an intra-frame space defined between the pair of main frame rails and between at least a pair of cross members transversely interconnected to the pair of main frame rails;
   a front subframe configured to support a front axle assembly and a cab, the front subframe including a pair of upper frame members operably connected to the corresponding pair of the main frame rails; and
   a rear subframe configured to support at least one rear axle assembly having an electric motor powered by the battery modules and any of the set of multiple configurable rear payload modules via a common connection interface, the rear subframe including a pair of rear frame rails transversely connected by at least a pair of cross members and operably connected to the corresponding pair of main frame rails, the rear subframe further including a set of pre-drilled mounting holes in each rear frame rail at a plurality of predetermined longitudinal positions such that a mounted location of the rear axle assembly is longitudinally variable at different predetermined distances from a back of the cab corresponding to different ones of the set of pre-drilled mounting holes,
   wherein at least one of the front subframe and rear subframe includes an axle mount box structure formed of a pair of secondary frame rails each having a C-shaped cross-section oriented inwardly and a pair of cross-members each having an I-shaped cross-section, wherein the corresponding axle assembly is only mounted to the axle mount box structure.

2. The universal chassis frame of claim 1, wherein each of the pair of main frame rails and the pair of rear frame rails has a C-shaped cross-section oriented inwardly, and each of the at least pair of cross members have an I-shaped cross-section.

3. The universal chassis frame of claim 1, wherein the pair of main frame rails and the pair of rear frame rails are operably connected by a set of plates extending horizontally therebetween on an outer side of both of the corresponding frame rails.

4. The universal chassis frame of claim 1, wherein the common connection interface comprises a standard set of mounting holes in each of a pair of secondary frame rails that are operably connectable by a set of plates extending horizontally above and on an outer side of both of the corresponding rear frame rails.

5. The universal chassis frame of claim 1, wherein the rear subframe is configurable to accommodate at least one axle rear assembly in at least two different predetermined distances from the back of the cab to change an unloaded center of gravity of the configurable electric truck.

6. The universal chassis frame of claim 5, wherein the at least two different predetermined distances from the back of the cab correspond to at least two subsets in the set of multiple configurable rear payload modules, each subset having a different predetermined distance corresponding to an unloaded center of gravity of the rear payload modules in that subset.

7. The universal chassis frame of claim 1, wherein for different ones of the set of multiple configurable rear payload modules a range of dimensions from the back of the cab to the rear axle is between 60"-200" and a range of dimensions from the rear axle to the back of the rear frame is between 30"-80".

8. A universal chassis frame for a configurable electric truck having a gross vehicle weight rating in a range above 10,000 lbs with the chassis frame configured to interface with any of a set of multiple configurable rear payload modules, the universal chassis frame comprising:
 a central frame having a pair of main frame rails configured to support at least two battery modules within an intra-frame space defined between the pair of main frame rails and between at least a pair of cross members transversely interconnected to the pair of main frame rails;
 a front subframe configured to support a front axle assembly and a cab, the front subframe including a pair of upper frame members operably connected to the corresponding pair of the main frame rails; and
 a rear subframe configured to support at least one rear axle assembly having an electric motor powered by the battery modules and any of the set of multiple configurable rear payload modules via a common connection interface having a standard set of mounting holes in each of a pair of secondary frame rails that are operably connectable by a set of plates extending horizontally above and on an outer side of both of the corresponding rear frame rails, and the pair of main frame rails and the pair of rear frame rails are operably connected by a set of plates extending horizontally therebetween on an outer side of both of the corresponding frame rails,
 wherein the rear subframe includes a pair of rear frame rails transversely connected by at least a pair of cross members and operably connected to the corresponding pair of main frame rails, the rear subframe further including a set of pre-drilled mounting holes in each rear frame rail at a plurality of predetermined longitudinal positions such that a mounted location of the rear axle assembly is longitudinally variable at different predetermined distances from a back of the cab corresponding to different ones of the set of pre-drilled mounting holes.

9. The universal chassis frame of claim 8, wherein the rear subframe is configurable to accommodate at least one axle rear assembly in at least two different predetermined distances from the back of the cab to change an unloaded center of gravity of the configurable electric truck.

10. A universal chassis frame for a configurable electric truck having a gross vehicle weight rating in a range above 10,000 lbs with the chassis frame configured to interface with any of a set of multiple configurable rear payload modules, the universal chassis frame comprising:
 a central frame having a pair of main frame rails configured to support at least two battery modules within an intra-frame space defined between the pair of main frame rails and between at least a pair of cross members transversely interconnected to the pair of main frame rails;
 a front subframe configured to support a front axle assembly and a cab, the front subframe including a pair of upper frame members operably connected to the corresponding pair of the main frame rails; and
 a rear subframe configured to support at least one rear axle assembly having an electric motor powered by the battery modules and any of the set of multiple configurable rear payload modules via a common connection interface, the rear subframe including a pair of rear frame rails transversely connected by at least a pair of cross members and operably connected to the corresponding pair of main frame rails, the rear subframe further including a set of pre-drilled mounting holes in each rear frame rail at a plurality of predetermined longitudinal positions such that a mounted location of the rear axle assembly is longitudinally variable at different predetermined distances from a back of the cab corresponding to different ones of the set of pre-drilled mounting holes,
 wherein the pair of main frame rails and the pair of rear frame rails are operably connected by a set of plates extending horizontally therebetween on an outer side of both of the corresponding frame rails.

11. The universal chassis frame of claim 10, wherein at least one of the front subframe and rear subframe includes an axle mount box structure formed of a pair of secondary frame rails each having a C-shaped cross-section oriented inwardly and a pair of cross-members each having an I-shaped cross-section, wherein the corresponding axle assembly is only mounted to the axle mount box structure.

12. The universal chassis frame of claim 10, wherein the common connection interface comprises a standard set of mounting holes in each of a pair of secondary frame rails that are operably connectable by a set of plates extending horizontally above and on an outer side of both of the corresponding rear frame rail.

13. The universal chassis frame of claim 10, wherein each of the pair of main frame rails and the pair of rear frame rails has a C-shaped cross-section oriented inwardly, and each of the at least pair of cross members have an I-shaped cross-section.

14. The universal chassis frame of claim 10, wherein the rear subframe is configurable to accommodate at least one axle rear assembly in at least two different predetermined distances from the back of the cab to change an unloaded center of gravity of the configurable electric truck.

15. The universal chassis frame of claim 10, wherein for different ones of the set of multiple configurable rear payload modules a range of dimensions from the back of the cab to the rear axle is between 60"-200" and a range of dimensions from the rear axle to the back of the rear frame is between 30"-80".

16. A universal chassis frame for a configurable electric truck having a gross vehicle weight rating in a range above 10,000 lbs with the chassis frame configured to interface with any of a set of multiple configurable rear payload modules, the universal chassis frame comprising:
 a central frame having a pair of main frame rails configured to support at least two battery modules within an intra-frame space defined between the pair of main frame rails and between at least a pair of cross members transversely interconnected to the pair of main frame rails;
 a front subframe configured to support a front axle assembly and a cab, the front subframe including a pair of upper frame members operably connected to the corresponding pair of the main frame rails; and
 a rear subframe configured to support at least one rear axle assembly having an electric motor powered by the battery modules and any of the set of multiple configurable rear payload modules via a common connection interface, the rear subframe including a pair of rear frame rails transversely connected by at least a pair of cross members and operably connected to the corresponding pair of main frame rails, the rear subframe further including a set of pre-drilled mounting holes in each rear frame rail at a plurality of predetermined longitudinal positions such that a mounted location of the rear axle assembly is longitudinally variable at different predetermined distances from a back of the cab corresponding to different ones of the set of pre-drilled mounting holes, wherein the common connection interface comprises a standard set of mounting holes in each of a pair of secondary frame rails that are operably connectable by a set of plates extending horizontally above and on an outer side of both of the corresponding rear frame rails.

17. The universal chassis frame of claim 16, wherein at least one of the front subframe and rear subframe includes an axle mount box structure formed of a pair of secondary frame rails each having a C-shaped cross-section oriented inwardly and a pair of cross-members each having an I-shaped cross-section, wherein the corresponding axle assembly is only mounted to the axle mount box structure.

18. The universal chassis frame of claim 16, wherein the pair of main frame rails and the pair of rear frame rails are operably connected by a set of plates extending horizontally therebetween on an outer side of both of the corresponding frame rails.

19. The universal chassis frame of claim 16, wherein each of the pair of main frame rails and the pair of rear frame rails has a C-shaped cross-section oriented inwardly, and each of the at least pair of cross members have an I-shaped cross-section.

20. The universal chassis frame of claim 16, wherein for different ones of the set of multiple configurable rear payload modules a range of dimensions from the back of the cab to the rear axle is between 60"-200" and a range of dimensions from the rear axle to the back of the rear frame is between 30"-80".

* * * * *